(12) United States Patent
Mihalcea et al.

(10) Patent No.: US 11,300,276 B1
(45) Date of Patent: Apr. 12, 2022

(54) LUMINAIRE STRUCTURE

(71) Applicant: AXIS LIGHTING INC., Lasalle (CA)

(72) Inventors: Hristea Mihalcea, Lasalle (CA); Jean Gagné, Lasalle (CA); Theodore Porter, Lasalle (CA); Pierre-Luc Lussier, Lasalle (CA); Jennifer Abboud, Lasalle (CA); Andrew Miles, Lasalle (CA); Howard Yaphe, Lasalle (CA)

(73) Assignee: Axis Lighting Inc., LaSalle (CA)

( * ) Notice: Subject to any disclaimer, the term of this patent is extended or adjusted under 35 U.S.C. 154(b) by 0 days.

(21) Appl. No.: 17/037,361

(22) Filed: Sep. 29, 2020

(51) Int. Cl.
| | |
|---|---|
| *F21V 21/02* | (2006.01) |
| *F21S 8/04* | (2006.01) |
| *F21S 8/00* | (2006.01) |
| *F21Y 103/10* | (2016.01) |
| *F21Y 115/10* | (2016.01) |
| *F21V 21/36* | (2006.01) |
| *F21V 21/26* | (2006.01) |

(52) U.S. Cl.
CPC ............ *F21V 21/025* (2013.01); *F21S 8/037* (2013.01); *F21S 8/04* (2013.01); *F21V 21/26* (2013.01); *F21V 21/36* (2013.01); *F21Y 2103/10* (2016.08); *F21Y 2115/10* (2016.08)

(58) Field of Classification Search
CPC ........... F21S 8/037; F21S 8/028; F21V 21/36; F21V 31/34; F21V 21/30; F21V 21/26; F21V 21/34; F16M 11/10; F16M 13/025
See application file for complete search history.

(56) References Cited

U.S. PATENT DOCUMENTS

| | | | |
|---|---|---|---|
| 3,512,313 A | 5/1970 | Harz | |
| 3,704,906 A | 12/1972 | Abercrombie | |
| 3,918,751 A | 11/1975 | Blake | |
| 4,043,689 A | 8/1977 | Spencer et al. | |
| 4,449,166 A | 5/1984 | Sharp | |
| 5,997,158 A | 12/1999 | Fischer | |
| 8,028,964 B2 * | 10/2011 | Monaco | F16M 11/10 248/292.14 |

(Continued)

FOREIGN PATENT DOCUMENTS

KR     20110003394     4/2011

OTHER PUBLICATIONS

Alanod, "Products," accessed on-line at: https://alanod.com/products, (publicly available Prior to Jun. 11, 2020).

(Continued)

*Primary Examiner* — William N Harris
(74) *Attorney, Agent, or Firm* — Barnes & Thornburg LLP

(57) ABSTRACT

Disclosed is a luminaire structure for location in a corner. The luminaire structure has a housing including first and second housing structure segments configured to be located adjacent the corner in an operative position. The housing is configured to support at least one LED array, and to support at least one light delivery structure to be located at or adjacent a light output region. The housing has at least one internal services region to receive one or more components therein. A mounting interface is configured to cooperate with the housing and/or an anchor structure mounted in or adjacent to the corner area, to enable the housing to be deployed between a servicing position and an operative position. The housing is proximal to the anchor structure, at least in part, and the internal services region is rendered inaccessible for servicing by its proximity to the housing and the corner.

26 Claims, 31 Drawing Sheets

(56) References Cited

U.S. PATENT DOCUMENTS

| | | | |
|---|---|---|---|
| D669,208 S | | 10/2012 | Hierzer et al. |
| RE45,162 E | | 9/2014 | Hierzer |
| 9,206,948 B1 | | 12/2015 | Scribante |
| 10,151,435 B2 | * | 12/2018 | Pearson .............. G06Q 30/0633 |
| 10,203,077 B1 | * | 2/2019 | Bremser ................. F21S 8/037 |
| 2005/0117333 A1 | * | 6/2005 | Yoshida .................. F21V 21/30 |
| | | | 362/147 |
| 2008/0086962 A1 | | 4/2008 | Jahn |
| 2010/0213654 A1 | | 8/2010 | Lin |
| 2011/0176295 A1 | | 7/2011 | Chang et al. |
| 2011/0235342 A1 | | 9/2011 | Liang |
| 2011/0239503 A1 | | 10/2011 | Liao |
| 2012/0020067 A1 | | 1/2012 | Mai |
| 2014/0268829 A1 | | 9/2014 | Mandy |
| 2015/0085476 A1 | | 3/2015 | Mandy |
| 2015/0219825 A1 | | 8/2015 | Wu |
| 2016/0010817 A1 | | 1/2016 | Hierzer |
| 2016/0138788 A1 | | 5/2016 | Sareyka et al. |
| 2017/0343194 A1 | * | 11/2017 | Campbell ................. E04B 9/30 |
| 2017/0356605 A1 | | 12/2017 | Harz |
| 2019/0162392 A1 | | 5/2019 | Guerra et al. |
| 2019/0285265 A1 | | 9/2019 | Lee et al. |

OTHER PUBLICATIONS

Enlighted, "Smart Sensors," accessed on-line at: https://www.enlightedinc.com/system-and-solutions/iot-system/smart-sensors, (publicly available prior to Jun. 11, 2020).

XAL Inc., "Leno-Zero Plenum Luminaire," (Apr. 29, 2015).

\* cited by examiner

LUMINAIRE STRUCTURE

REFERENCE TO CO-PENDING APPLICATIONS

The disclosures set forth in the following applications are incorporated herein by reference in their entireties:

a) U.S. patent application Ser. No. 16/676,109, filed Nov. 6, 2019, entitled REMOVABLE POSITIONING OF LIGHT FIXTURES;

b) U.S. patent application Ser. No. 16/899,047, filed Jun. 11, 2020, entitled LUMINAIRE STRUCTURE; and c) U.S. Design patent application No. 29/614,750, filed Aug. 22, 2017 (Now U.S. Pat. No. D895887), entitled LUMINAIRE STRUCTURE.

d) U.S. patent application Ser. No. 29/749,166, filed Sep. 3, 2020, entitled LUMINAIRE STRUCTURE

FIELD OF THE DISCLOSURE

The present disclosure relates to luminaire structures and associated structures, for mounting in designated boundary regions in an interior space, such as in a corner boundary region.

BACKGROUND

Lighting continues to be an important aspect of interior design, with an increasing number of approaches to mount luminaire structures on interior room surfaces. However, conventional approaches tend to involve fastening such luminaire structures to electrical junction boxes and, if required, for supplemental fastening directly to an interior surface at a distance from the junction box. In this case, access to internal components often requires the removal of a panel on the luminaire structure or the complete removal of the luminaire structure from the interior surface itself. Some locations in rooms, such as in some locations where access can be restricted or constrained by the surfaces and other formations at the location, such as in a corner or edge of a room. In these constrained locations access to a luminaire structure for servicing may often only be achievable by completely removing the entire luminaire structure from the wall, or by removing a lens from the luminaire structure, which may in some cases be awkward, time consuming and possible cause damage to the lens itself.

It may thus be desirable to provide novel approaches for mounting luminaire structures, or at least to provide the public with one or more useful alternatives.

SUMMARY

An aspect provides a luminaire structure for location in a corner of an interior space defined by first and second adjacent boundary surfaces. The luminaire structure includes a housing structure with first and second housing structure segments for mounting next to the corresponding first and second boundary surfaces of the corner. The housing structure is configured to support at least one LED array of at least one LED, and to support at least one light delivery structure to be located at or adjacent a light output region to present light to the interior space. The housing structure has at least one internal services region to receive one or more components therein. A mounting interface is configured to cooperate with the housing structure and/or an anchor structure mounted in or adjacent to the corner, to enable the housing structure to be deployed between a servicing position in which the housing structure is distal to the anchor structure, at least in part, and the internal services region is accessible for servicing, and an operative position. The housing structure is proximal to the anchor structure, at least in part, and the internal services region is rendered inaccessible for servicing by its proximity to the housing structure and the first and second boundary surfaces.

Another aspect provides a luminaire structure for location in a corner boundary region of an interior space defined by first and second adjacent boundary surfaces. The luminaire structure comprises a housing structure including first and second housing structure segments respectively configured to be located adjacent the first and second boundary surfaces in an operative position. The housing structure is configured to support at least one LED array of at least one LED, and to support at least one light delivery structure to be located at, or adjacent, a light output region to present light to the interior space, and to define at least one internal services region to receive one or more components therein. A mounting interface is configured to cooperate with the housing structure and/or an anchor structure mounted in or adjacent to the corner boundary region, to enable the housing structure to be deployed between a servicing position in which the housing structure is distal to the anchor structure, at least in part, and the internal services region is accessible for servicing, and an operative position in which the housing structure is proximal to the anchor structure, at least in part, and the internal services region is rendered inaccessible for servicing by its proximity to the housing structure and the first and second boundary surfaces.

Some example embodiments may further comprise the anchor structure.

In some example embodiments, the anchor structure may be configured to extend along a first upper horizontal axis, wherein the housing structure, the mounting interface and/or the anchor structure include at least one releasable fastener structure to engage at least one location relative to the first upper horizontal axis to maintain the housing structure in the operative position.

In some example embodiments, the internal services region may be located adjacent a transitional region between the first and second housing structure segments.

Some example embodiments may further comprise at least one cover structure to conceal the internal services region, at least in part, wherein the cover is configured to be removably positioned on the housing structure, at least in part, and accessible in the servicing position for removal, and inaccessible in the operative position.

In some example embodiments, the at last one cover structure may extend along a length dimension of the housing structure.

In some example embodiments, the mounting interface may be configured to transfer the housing structure between the servicing position and the operative position about a least one pivot axis.

In some example embodiments, the mounting interface may include at least one first pivot structure extending between a first mounting location on the anchor structure and a second mounting location on the housing structure for pivotal movement relative to both the first and second mounting locations.

In some example embodiments, the mounting interface may include at least one second pivot structure engaged with the housing structure to pivotally couple with the first pivot structure at the second mounting location.

In some example embodiments, the first and second pivot structures may include complementary pivot coupling members configured to define a pivot travel limit at the servicing position.

In some example embodiments, the first and/or second pivot structures may define a pivot path, and the second and/or first pivot structures defines a traveler to travel along the pivot path, wherein the servicing position is defined by a pivot terminus defined therein.

In some example embodiments, the first and second pivot structures may be configured to define first and second termini to abut a proximal end region surface on the second and/or first pivot structures respectively in the servicing position.

In some example embodiments, the transitional region may include at least one mounting location to locate a power supply support structure thereto to support a power supply.

Some example embodiments may further comprise the at least one LED array, and the at least one light delivery structure.

Some example embodiments may further comprise the power supply.

In some example embodiments, the anchor structure may include an opening configured to extend along a first upper horizontal axis, the opening having opposed longitudinal boundaries to form the first mounting location therebetween, and wherein the first pivot structure includes at least one first end region with a pair of opposed end surface regions, with each thereof configured to engage a corresponding longitudinal boundary.

In some example embodiments, the first pivot structure may be configured to pivot by contact between a first of the opposed end regions and a corresponding first of the opposed longitudinal boundaries.

In some example embodiments, the first pivot structure may be configured to be limited in pivotal travel in at least one direction by contact between a second of the opposed end regions and a corresponding second of the opposed longitudinal boundaries.

Some example embodiments may further comprise a limit surface adjacent the second longitudinal boundary which is configured to follow the second end region through a first range of travel thereof during which contact is substantially maintained between the first end region and first longitudinal boundary, and wherein the second end region has a second range of angular travel beyond the limit surface to enable the first end region to be separated from the first longitudinal boundary so that the first pivot structure may be removed from the anchor structure.

Another aspect provides a method for servicing a luminaire structure in a corner boundary region of an interior space defined by first and second adjacent boundary surfaces including several steps. One step is providing a luminaire structure for location in the corner boundary region. The luminaire structure has a housing structure including first and second housing structure segments respectively configured to define a light output region and to support at least one LED array of at least one LED optically linked thereto. The first and second housing structure segments are configured to be located adjacent the first and second boundary surfaces in an operative position, and to define at least one internal services region to receive one or more components to service the at least one LED array. Another step is configuring a mounting interface to enable the housing structure to be deployed between a first and second position. In the first position the housing structure is distal to the corner boundary region, at least in part, and the internal services region is accessible for servicing. In the second position the housing structure is proximal to the corner boundary region with the first and second housing structure segments respectively adjacent the first and second boundary surfaces, and the internal services region is rendered inaccessible for servicing by its proximity to the housing structure and the first and second boundary surfaces.

Another aspect provides a luminaire structure comprising a housing structure comprising a light output region and configured to support at least one LED array of at least one LED and at least one power supply to the at least one LED array, at least one light delivery structure to be located at or adjacent a light output region to present light to an interior space adjacent the luminaire structure. An anchor structure is provided to anchor the housing structure to a designated boundary of the interior space, and a mounting interface configured to cooperate with the housing structure and/or the anchor structure to enable the housing structure to be deployed between a first position in which the housing structure is distal to the anchor structure, at least in part, and the at least one LED array and/or the power supply are accessible for servicing, and a second position in which the housing structure is proximal to the anchor structure, at least in part, and the at least one LED array and/or the power supply are inaccessible.

In some example embodiments, the mounting interface may be configured to transfer the housing structure between the first and second positions about a least one pivot axis.

In some example embodiments, the mounting interface may include at least one first pivot structure extending between a first mounting location on the anchor structure and a second mounting location on the housing structure for pivotal movement relative to both the first and second mounting locations.

In some example embodiments, the mounting interface may include at least one second pivot structure engaged with the housing structure to pivotally couple with the first pivot structure at the second mounting location.

In some example embodiments, the second pivot structure may include at least one flange to pivotally couple with the first pivot structure by way of corresponding at least one pivot element.

In some example embodiments, the at least one flange may include a passage to receive one the at least one pivot element on the first pivot structure.

In some example embodiments, the second pivot structure may include a passageway structure which terminates at opposite end regions thereof to form a slot with a corresponding flange to receive the first pivot structure therein, and wherein the pivot elements are defined by a common pivot pin to extend through the passageway structure in the flanges and the passageway.

In some example embodiments, the first pivot structure may include a pair of spaced pivot arms.

In some example embodiments, the anchor structure may include an opening configured to extend along a first upper horizontal axis, the opening having opposed longitudinal boundaries to form the first mounting location therebetween, and wherein each of the pivot arms has a first end region with a pair of opposed shoulders to engage a corresponding longitudinal boundary.

Another aspect provides luminaire structure comprising a housing structure comprising a light output region and configured to support at least one LED array of at least one LED and at least one power supply to the at least one LED array. At least one light delivery structure may be located at or adjacent a light output region to present light to an interior space adjacent the luminaire structure. An anchor structure may be provided to anchor the housing structure to a designated boundary of the interior space, while a mounting interface may be configured to cooperate with the housing structure and/or the anchor structure to enable the housing structure to be deployed between a first position in which the housing structure is distal to the anchor structure, at least in part, and the at least one LED array and/or the power supply are accessible for servicing, and a second position in which the housing structure is proximal to the anchor structure, at least in part, and the at least one LED array and/or the power supply are inaccessible.

Another aspect provides a luminaire structure comprising a first housing structure comprising a light output region and configured to support at least one LED array of at least one LED, and a light output region, at least one light delivery structure to be located at or adjacent the light output region to present light to an interior space adjacent the luminaire structure. A second housing structure may be configured to be anchored to a designated boundary of the interior space and configured to support a power supply to the at least one array. A mounting interface may be configured to cooperate with the first and second housing structures to enable the first housing structure to be deployed between a first position in which the first housing structure is distal to the second housing structure, at least in part, to render the at least one LED array and/or the power supply accessible for servicing, and a second position in which the first housing structure is proximal to the second housing structure, at least in part, and in which the at least one LED array and/or the power supply are inaccessible.

Another aspect provides a luminaire structure for location on a boundary region of an interior space, comprising a housing structure configured to support at least one light delivery structure. An anchor structure is configured to be positioned at a mounting location on the boundary region. A mounting structure is configured to cooperate with the housing structure and the anchor structure to enable the housing structure to be positioned in an operative position at the mounting location. The anchor structure is configured to provide a pair of opposed boundaries to extend along a mounting location axis, to form the mounting location therebetween. The mounting structure comprises a pair of opposed end surface regions, with each thereof configured to engage a corresponding boundary when in the operative position. The mounting structure is configured to be passed between the opposed boundaries, when in a first angular orientation relative to the anchor structure, so that a first of the end regions engages a corresponding first of the opposed boundaries, while a second of the opposed boundaries is configured to define a second angular orientation corresponding to the operative position, and wherein the anchor structure is configured to define a range of travel of the mounting structure between the first and second angular positions in which the mounting structure cannot be removed from the anchor structure.

In some example embodiments, the mounting structure is configured to define at least a portion of the travel between the first and second angular positions to pivotal travel by contact between the first end region and first boundary.

Some example embodiments may further comprise a limit surface adjacent the second boundary which is configured to follow the second end region through a first range of travel thereof during which contact is substantially maintained between the first end region and first boundary, and wherein the second end region has a second range of angular travel beyond the limit surface to enable the first end region to be separated from the first boundary so that the first pivot structure may be removed from the anchor structure.

Another aspect provides a luminaire structure for location on a boundary region of an interior space, comprising a housing structure configured to support at least one light delivery structure to present light to the interior space. An anchor structure is configured to be positioned on the boundary region. A mounting interface is configured to cooperate with the housing structure and the anchor structure to enable the housing structure to be positioned in an operative position at a mounting location on the boundary region. The anchor structure configured to provide an opening to extend along an axis along the boundary region, the opening having opposed longitudinal boundaries to form the first mounting location therebetween. The mounting interface includes a mounting structure with a pair of opposed end surface regions, with each thereof configured to engage a corresponding longitudinal boundary in an operative position. The mounting structure is configured to be passed through the opening in a first angular orientation relative to the anchor structure, so that a first of the end regions engages a corresponding first of the longitudinal boundaries of the anchor structure, while a second of the longitudinal boundaries is configured to define a second angular orientation in which the first and second end regions engage the corresponding first and second boundaries.

BRIEF DESCRIPTION OF THE FIGURES

Several exemplary embodiments of the present disclosure will be provided, by way of examples only, with reference to the appended drawings, wherein:

FIGS. 13 and 15 are sectional side and perspective views respectively, of the luminaire structure of FIG. 10 in the intermediate position of FIG. 12;

Figure 1:
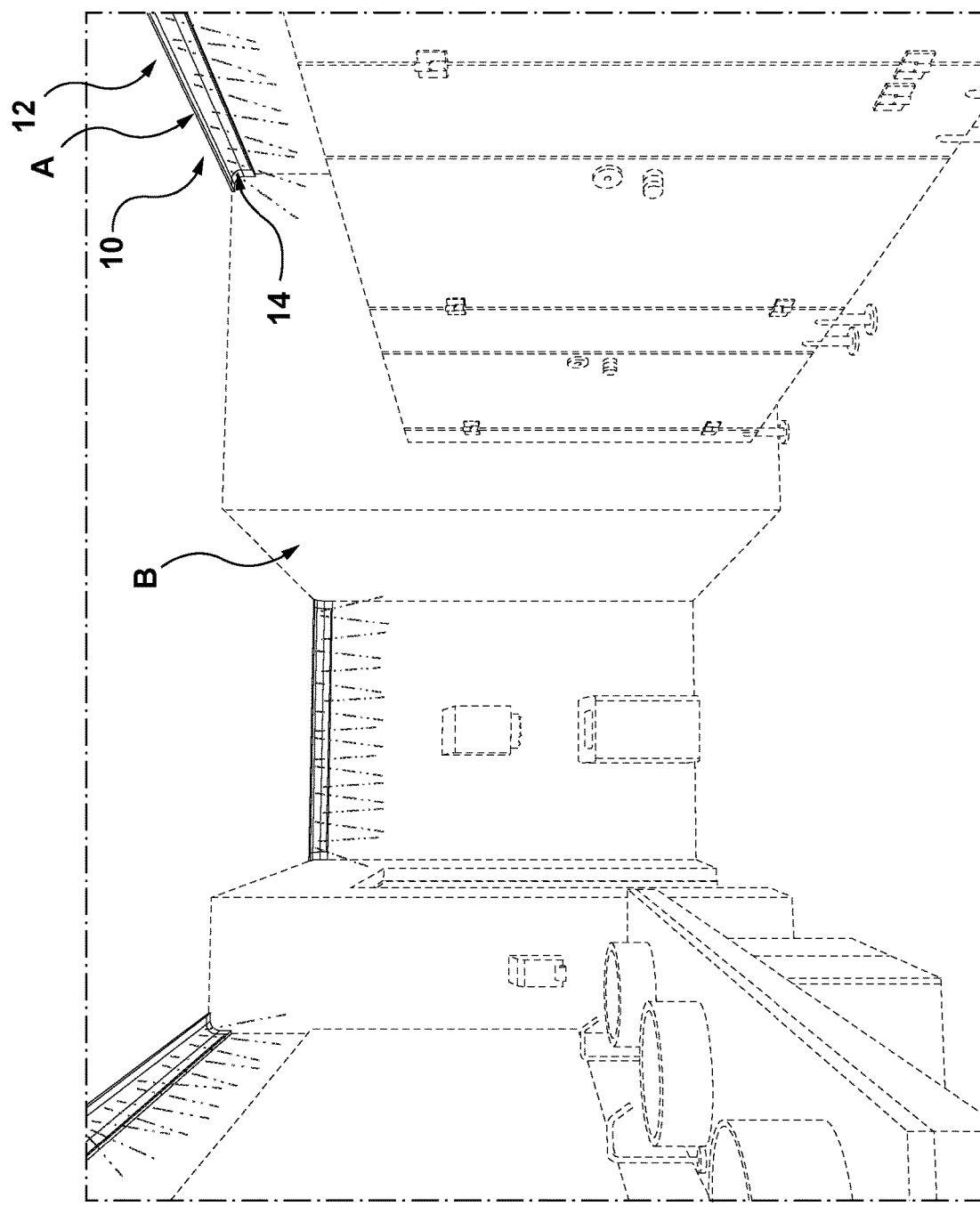
FIG. 1 is a perspective schematic view of an interior space with a number of luminaire structures installed at a designated boundary therein.

The broken lines in FIGS. 17-30 are provided for purposes of illustrating portions of the design that include environment.

The luminaire structure is shown in FIGS. 17-21, 24-26, and 29-30, with symbolic break lines along its length. The appearance of a portion of the luminaire structure between the break lines does not form part of the design. A separation and a bracket are used to indicate that, for ease of illustration, the specific dimension of the article associated with the separation and bracket is not claimed and is to be broadly interpreted. The subject matter herein includes any of the present figures with any such symbolic break lines removed, or with one or more further symbolic break lines added. Thus, any removal or addition of one or more any such symbolic break lines is not new matter.

DETAILED DESCRIPTION

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, and vertical are intended for operative context only and are not necessarily intended to limit the invention only to those configurations or orientations. In any instance in which the disclosure refers to a single instance of an element, example embodiments may include a multiple of such elements. The term "at least one" in reference to any element is not intended to force an interpretation on any other reference elsewhere in the disclosure to a single instance of an element to mean only one such instance of the element. Furthermore, and as described in subsequent paragraphs, the specific mechanical and/or other configurations illustrated in the drawings are intended to exemplify embodiments of the invention. However, other alternative mechanical and/or other configurations are possible which are considered to be within the teachings of the instant disclosure. Furthermore, any one element, feature, structure, function, of any aspect and/or example embodiment described in the present disclosure including the figures, clauses and/or claims herein, may itself be claimed on its own or be combined with any one or more elements, features, structures, functions, and/or steps from the same or any other aspects and/or example embodiments described in the present disclosure including the figures, clauses and/and claims herein.

The term "LED" used herein may include, but not be limited to, semiconductor, electroluminescent, organic, polymeric or other material based light sources commonly known as generally as light emitting diodes, as well as polymeric and other such light sources, equivalents and variants thereof.

Figure 2:
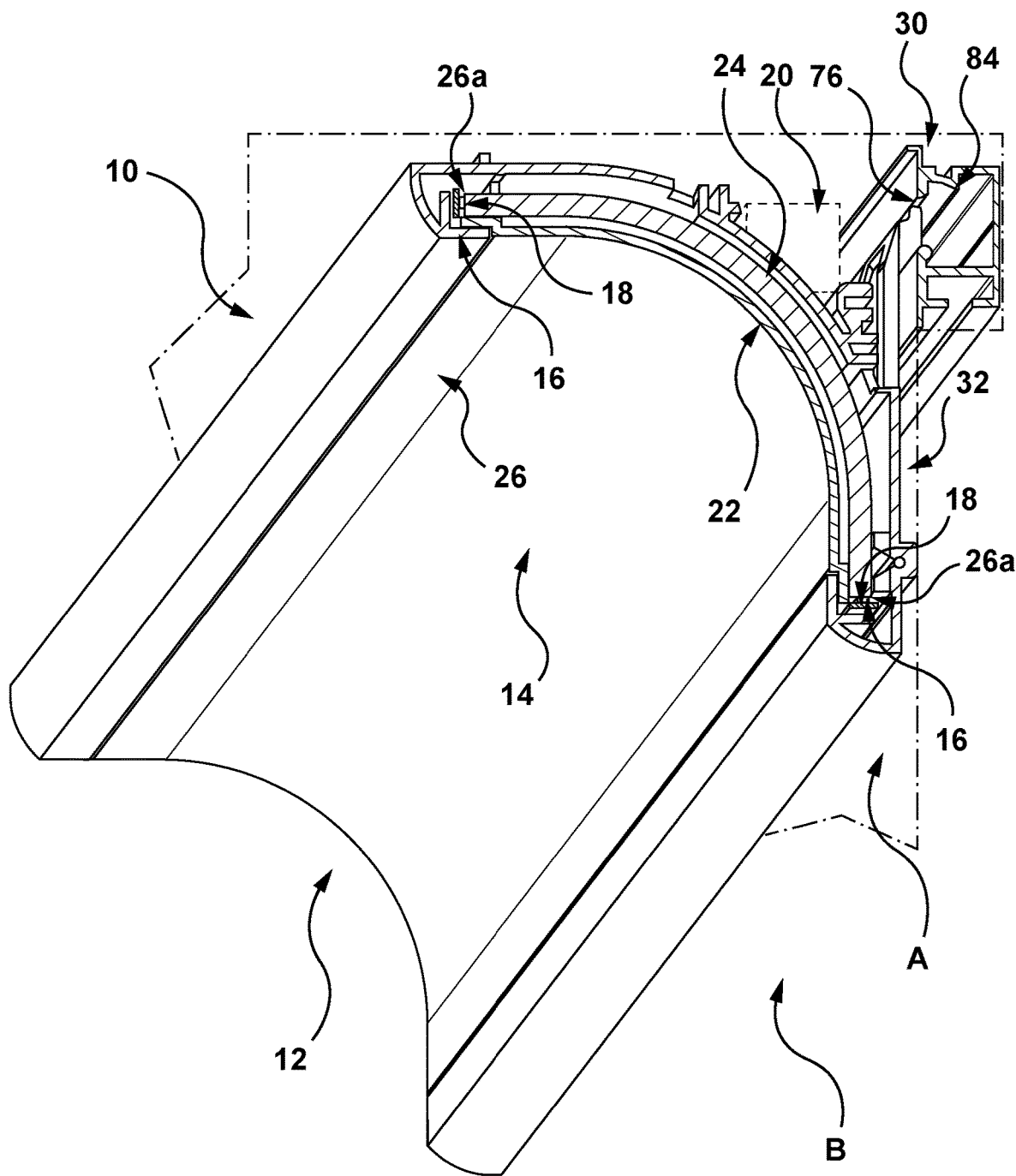
FIG. 2 is a perspective sectional view of the luminaire structure of FIG. 1, in a second position according to FIG. 4 below.

Referring to FIGS. 1 and 2, there is provided a luminaire structure 10 comprising a housing structure 12 having a light output region 14 and mounted at a designated boundary shown schematically at A, such as a wall surface in the region of a corner boundary in an interior space B. The luminaire structure 10 is configured to support at least one LED array of at least one LED, shown at 16 and 18 respectively, and at least one power source or supply shown schematically at 20 to the at least one LED array 16.

At least one light delivery structure 22 is also configured to be located at or adjacent a light output region 14 to present light to the interior space B adjacent the luminaire structure 10. In this case, the light delivery structure 22 may include a light guide 24, and/or a lens and/or diffuser, in this case shown generally at 26, while the at least one LED array 16 may be deployed along one or more edge regions, in this case opposed edge regions 26a, of the light guide 24.

Figure 3:
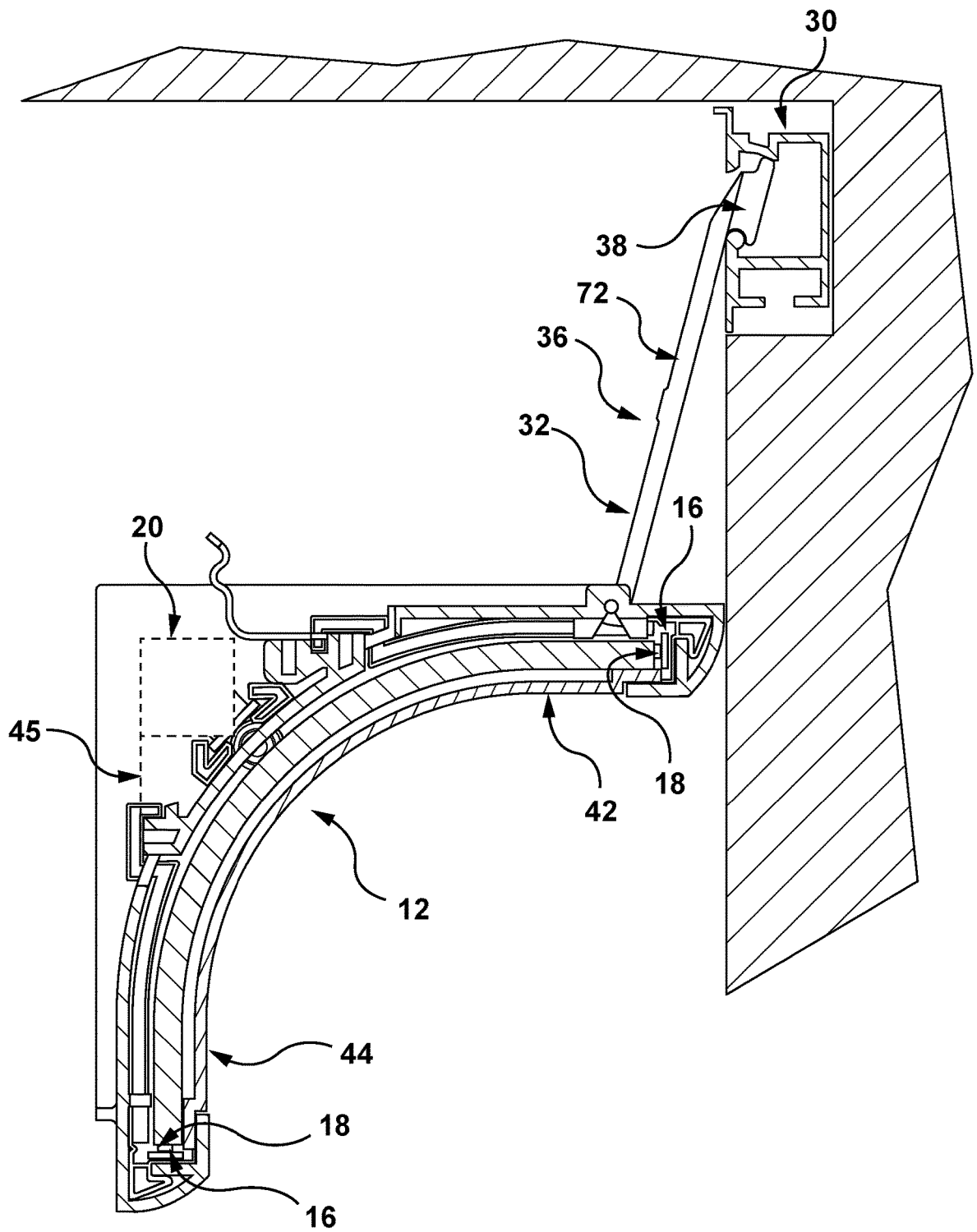
FIGS. 3 and 4 are fragmentary sectional schematic side views of the luminaire structure of FIG. 1 in respective first and second positions.

An anchor structure 30 may be configured to anchor the housing structure 12 to the designated boundary A of the interior space B. A mounting interface 32 may be configured to cooperate with the housing structure 12 and/or the anchor structure 30 to enable the housing structure 12 to be deployed between a first position as shown in FIG. 3, in which the housing structure 12 is distal to the anchor structure 30, at least in part, and the at least one LED array 16 and/or the power supply 20 are accessible for servicing, and a second position as shown in FIG. 4, in which the housing structure 12 is proximal to the anchor structure 30, at least in part, and the at least one LED array 16 and/or the power supply 20 are inaccessible.

Figure 6:
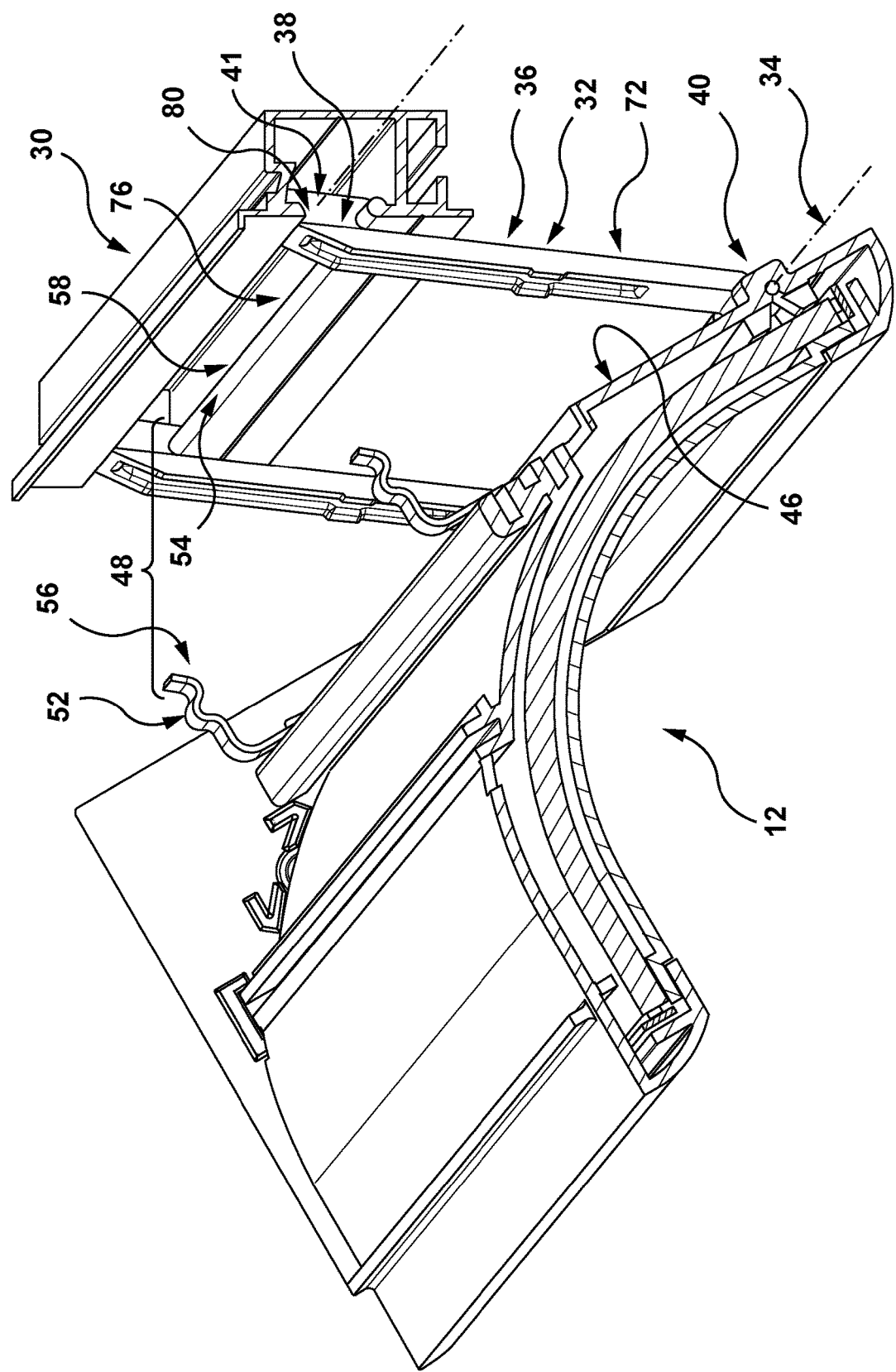
FIGS. 6 and 7 are perspective sectional views of a portion of the luminaire structure (without the power supply shown in FIGS. 2 and 4) in the intermediate position of FIG. 5.
Figure 7:
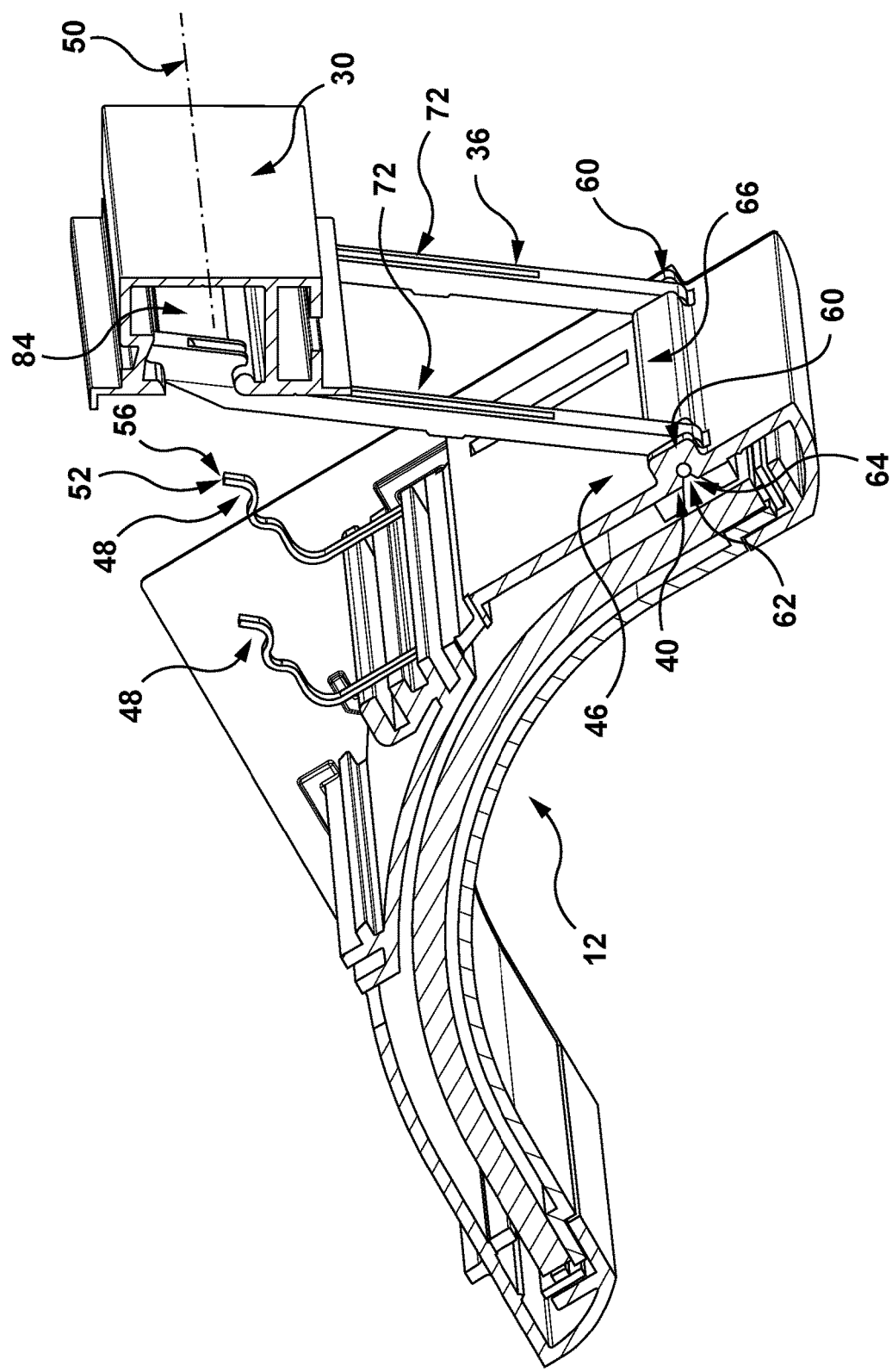

FIGS. 6 and 7 show the housing structure 12 in an intermediate position without the power supply 20. As shown in FIG. 6, the mounting interface 32 may be configured to transfer the housing structure 12 between the first and second positions about a least one pivot axis such as the pivot axis shown at 34. The mounting interface 32 may include at least one first pivot structure 36 (FIG. 6) extending between a first mounting location 38 on the anchor structure 30 and a second mounting location 40 on housing structure 12 for pivotal movement relative to both the first and second mounting locations 38, 40 about pivot axes 41, 34. In this instance, pivotal movement about the axis 41 may be less in rotational travel, when compared with the pivotal movement about axis 34 during the transfer between the first and second positions.

Figure 4:
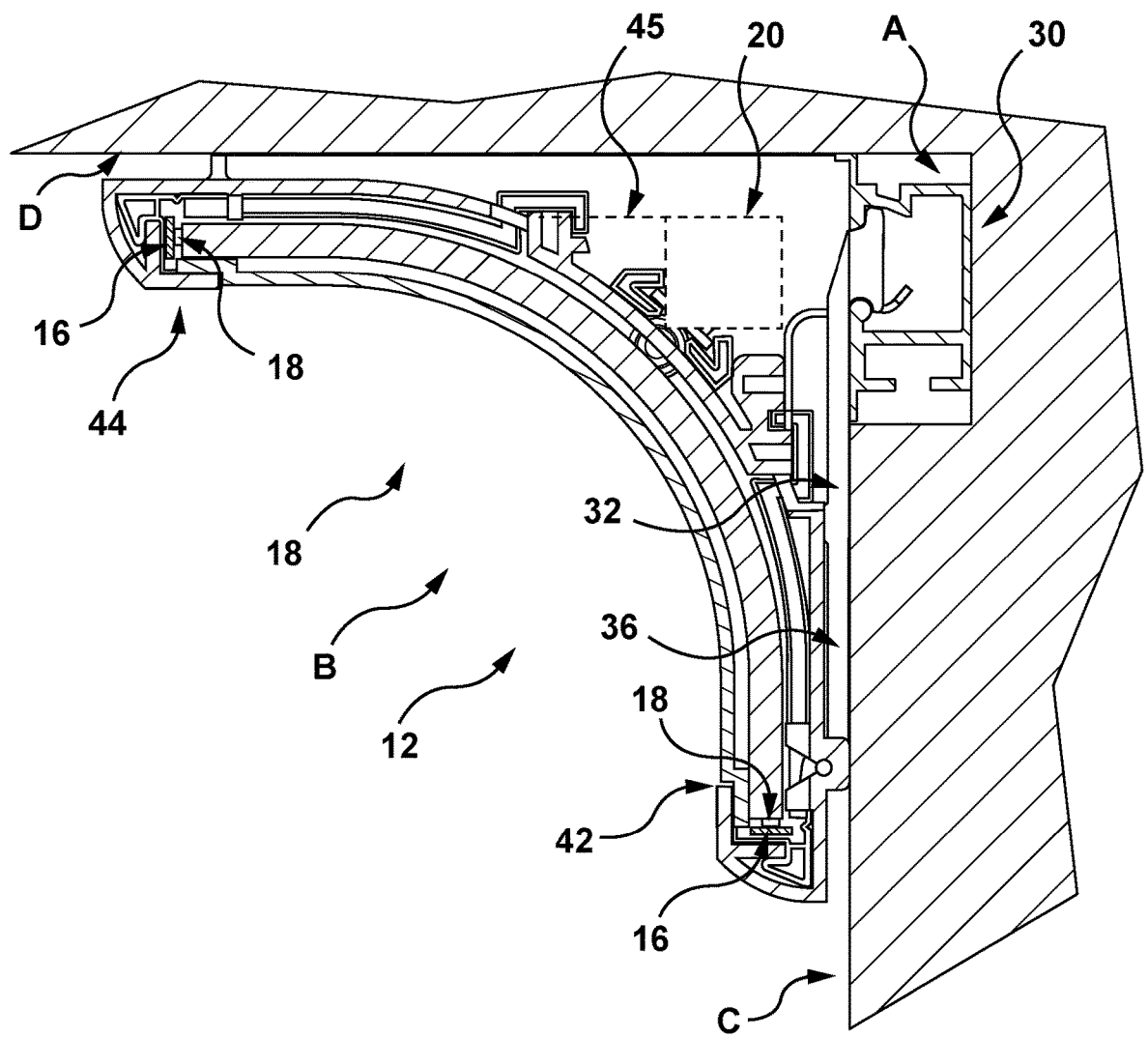

In some example embodiments, as shown in FIG. 4, the housing structure 12 may be provided with a first housing structure segment 42 configured to be aligned with the at least one first pivot structure 36 at a wall surface, in this case an upright wall surface C, at least in part, when the housing structure 12 is in the second position, and a second housing segment 44 to extend laterally outwardly from the surface C, in this case along a ceiling surface D, when the housing structure 12 is in the second position. In this case, the first and second housing segments 42, 44 form a continuous curved transitional profile in cross section, but may also in other example embodiments be provided with a more defined distinction between the respective housing segments 42, 44.

Figure 5:
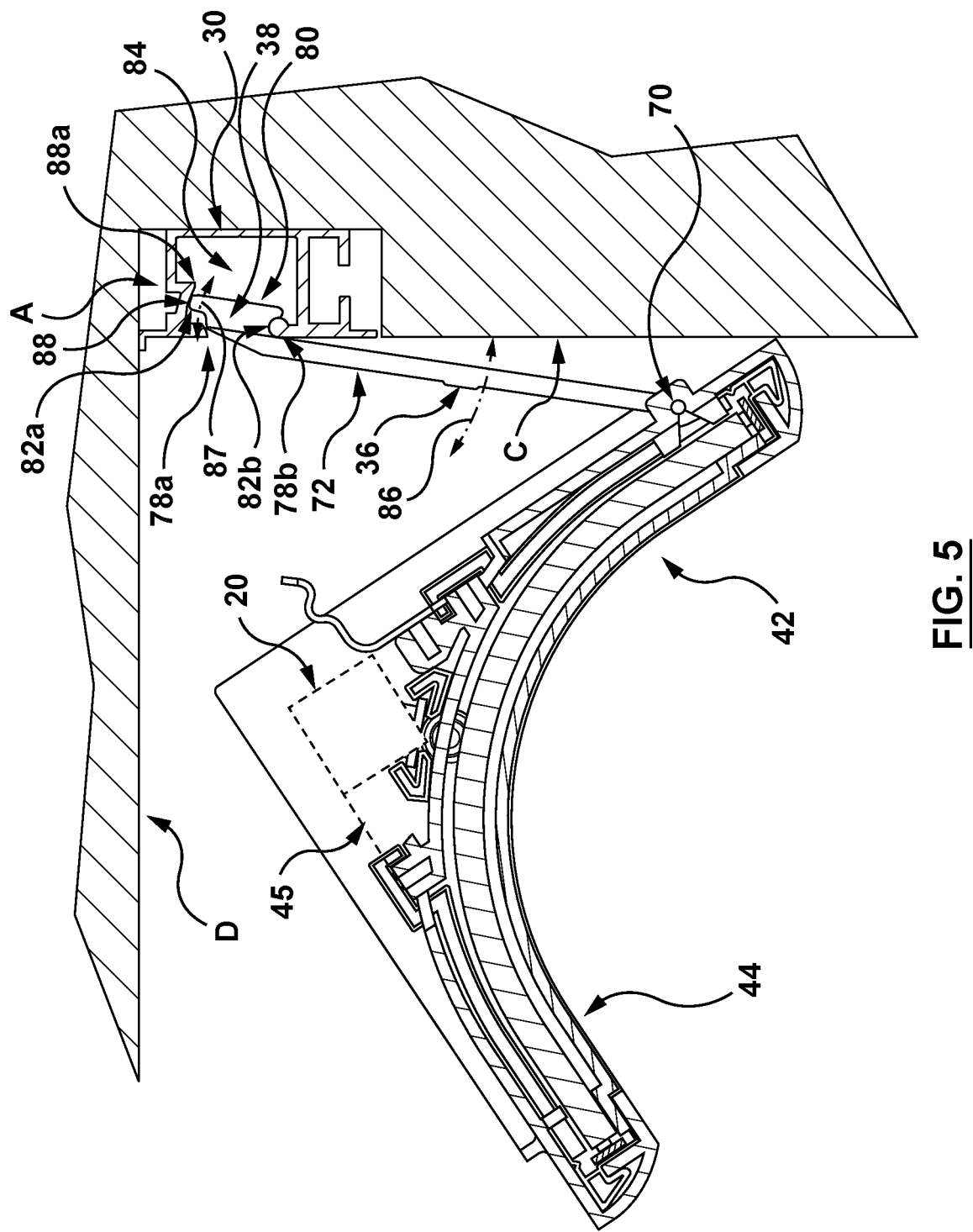
FIG. 5 is a schematic side view of the luminaire structure of FIG. 1 in an intermediate position between the first and second positions and FIG. 5A is an enlarged view of an upper portion of the luminaire structure as shown in FIG. 5.
Figure 5A:
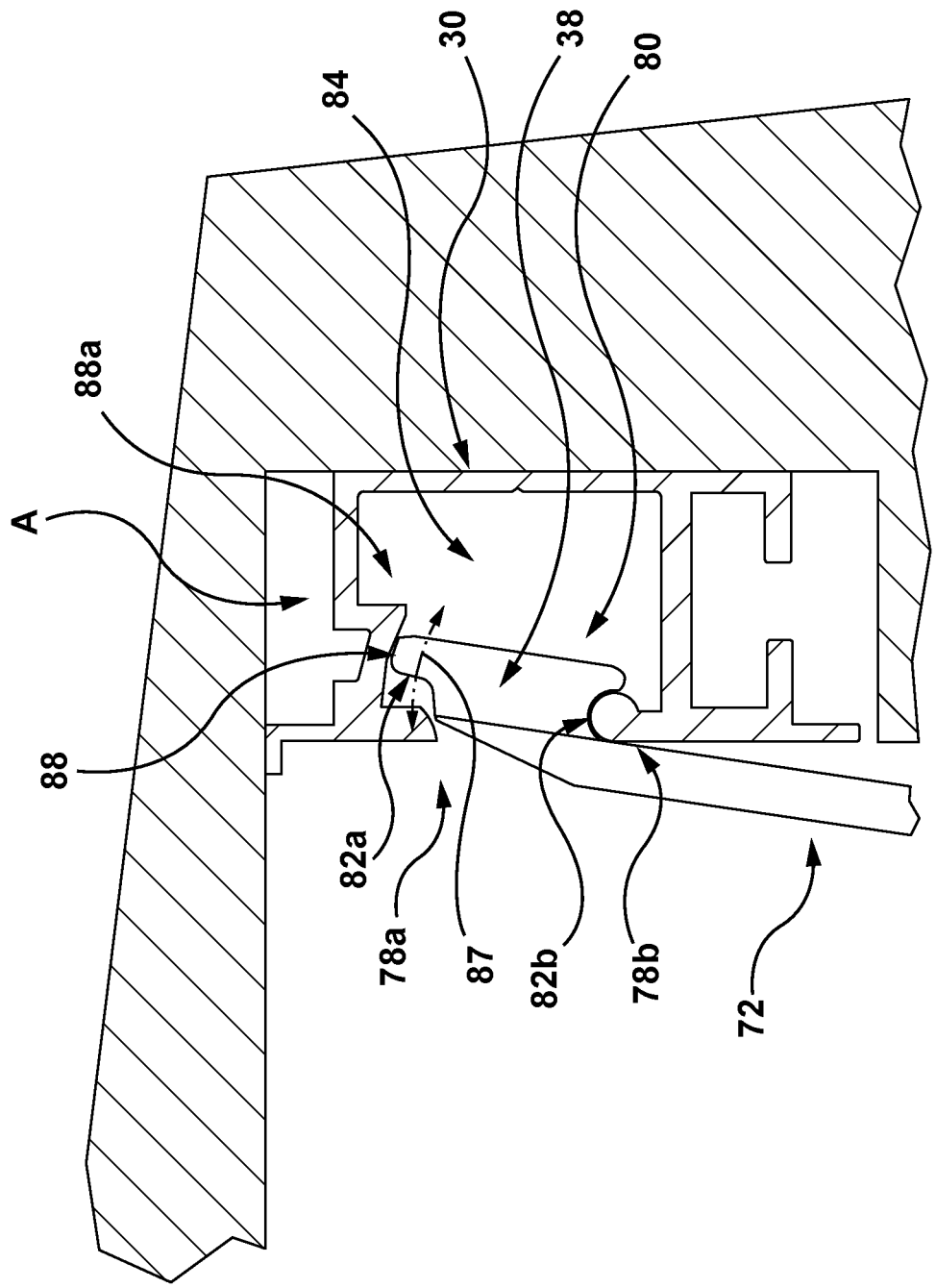

As can be seen in FIG. 5, the accessibility of the power supply 20 may be seen in the region of the housing structure 12, intermediate the first and second housing segments 42, 44 and held on a mounting structure shown schematically at 45. The anchor structure 30 may be configured to function as another housing structure, so that both the housing structure 12 and the anchor structure 30 may support components, such as the power supply 20, wiring and/or cabling between the power supply 20 and the LED array 16, between the power supply 20 and line power sources or the like, or support brackets to position the power supply 20 in the respective anchor structure, as well as coupling structures to join adjacent spans of both the housing structure 12 and the anchor structure along the designated boundary B. The adjacent spans may be further configured to enable multiples thereof to be affixed so that they are transferred together between the first and second positions, or to remain separate, or combinations of affixed spans and separate spans as the need arises.

Referring to FIGS. 6 and 7, the mounting interface 32 may include at least one second pivot structure 46 on the housing structure 12 to pivotally couple with the first pivot structure 36 at the second mounting location 40.

The mounting interface 32 may include at least one releasable fastener structure 48 to releasably fasten the housing structure 12 at or to the anchor structure 30 and/or the first pivot structure 36 in the second position, as shown in FIG. 4.

Referring to FIGS. 6 and 7, the anchor structure 30 may be configured to extend along a first upper horizontal axis 50 (FIG. 7), and the mounting interface 32 may include complementary fastener portions 52, 54 to engage at least one location along the first upper horizontal axis 50. In this case, the releasable fastener 48 may include at least one releasable clip 56 extending outwardly from the region of the housing structure 12 facing the anchor structure 30 to engage a corresponding clip engaging surface 58 on the anchor structure 30.

Referring to FIG. 7, the second pivot structure 46 may include a pair of flanges 60 to pivotally couple with the first pivot structure 36 by way of corresponding pair of pivot elements 62. Each flange 60 may thus include a passage 64 to receive the pivot elements 62.

The second pivot structure 46 may include a passageway structure 66 which terminates at opposite end regions thereof to form respective slot or gap with a corresponding flange 60 to receive the first pivot structure 36 therein, as shown in FIG. 7. In this example, the pivot elements 62 may be defined by a common pivot pin to extend through the aligned passages in the flanges 60 and the passageway structure 66.

Referring to FIGS. 5 to 7, the first pivot structure 36 may include a pair of spaced pivot arms, as shown at 72 which may separate from one another or form part of a common structure.

Referring to FIGS. 5 and 6, the anchor structure 30 may include an opening 76 extending along the first upper horizontal axis 50. The opening 76 may thus be provided with opposed upper and lower longitudinal boundaries 78a, 78b (FIG. 5) to form the first mounting location 38 therebetween. Each of the pivot arms 72 may be provided with a first end region 80 with a pair of opposed surfaces in the form of (in this instance upper and lower) shoulders 82a, 82b (FIG. 5) to engage a corresponding (in this instance upper and lower) boundary 78a, 78b.

The anchor structure 30 may include an interior cavity 84 in communication with the opening 76, wherein the interior cavity 84 may be dimensioned to receive one or more components of the luminaire structure, for example as described above, and/or may serve as a conduit to receive cabling to join the power supply 20 with a power source, or with one or more switching/dimming control systems.

The shoulders 82a, 82b may be configured so that each is able to rest against a corresponding longitudinal boundary 78a, 78b, enabling a degree of pivotal movement of the pivot arms 72 about the longitudinal boundary 78b, as shown by arrow 86, causing the shoulder 82a to move away from the longitudinal boundary 78a. Furthermore, the longitudinal boundary 78a may thus serve as a limit to the rotation translation of the shoulder 82a by its abutment therewith. A limit surface region 88 may be provided adjacent the boundary 78a which may be contoured to correspond to the travel of the shoulder region 82a as it moves away from the longitudinal boundary 78a, along the path shown by arrow 87 in FIG. 5. In this instance, the limit surface region 88 maintains contact of the shoulder region 82b against the corresponding boundary region 78b when the pivot arms 72 are pivoted away from their position adjacent the upright wall surface C when the luminaire structure 10 is in its intermediate or second position, that is while the pivot arms are in a first range of angular travel corresponding to the travel of an end region 72a of the pivot arms along the limit surface region 88.

The pivot arms may be pivoted further in a second range of travel in which the end region 72a passes an inner boundary 88a of the limit surface 88, thus allowing the end region 72a to be displaced into the inner cavity 84, so as to separate the lower shoulder 82b from contact with the lower longitudinal boundary 78b, and allowing the pivot arms 72 to be released from their pivot coupling with the anchor structure 30. This configuration may enable a relatively straightforward installation of the luminaire structure 10 on the anchor structure 30, by carrying out the above mentioned steps in reverse order. The mounting interface 32 may allow the luminaire structure to be shifted/slid along the anchor structure along cavity if need be, for instance to accommodate the installation of neighboring luminaire structures to form a line thereof as shown in FIG. 1. The mounting interface 128 may provide removably mounted luminaire structure for travel between the first (or servicing) and second (or operative) positions as needed, and may provide a relatively straightforward removal of the luminaire structure by executing steps as indicated above.

Figure 8:
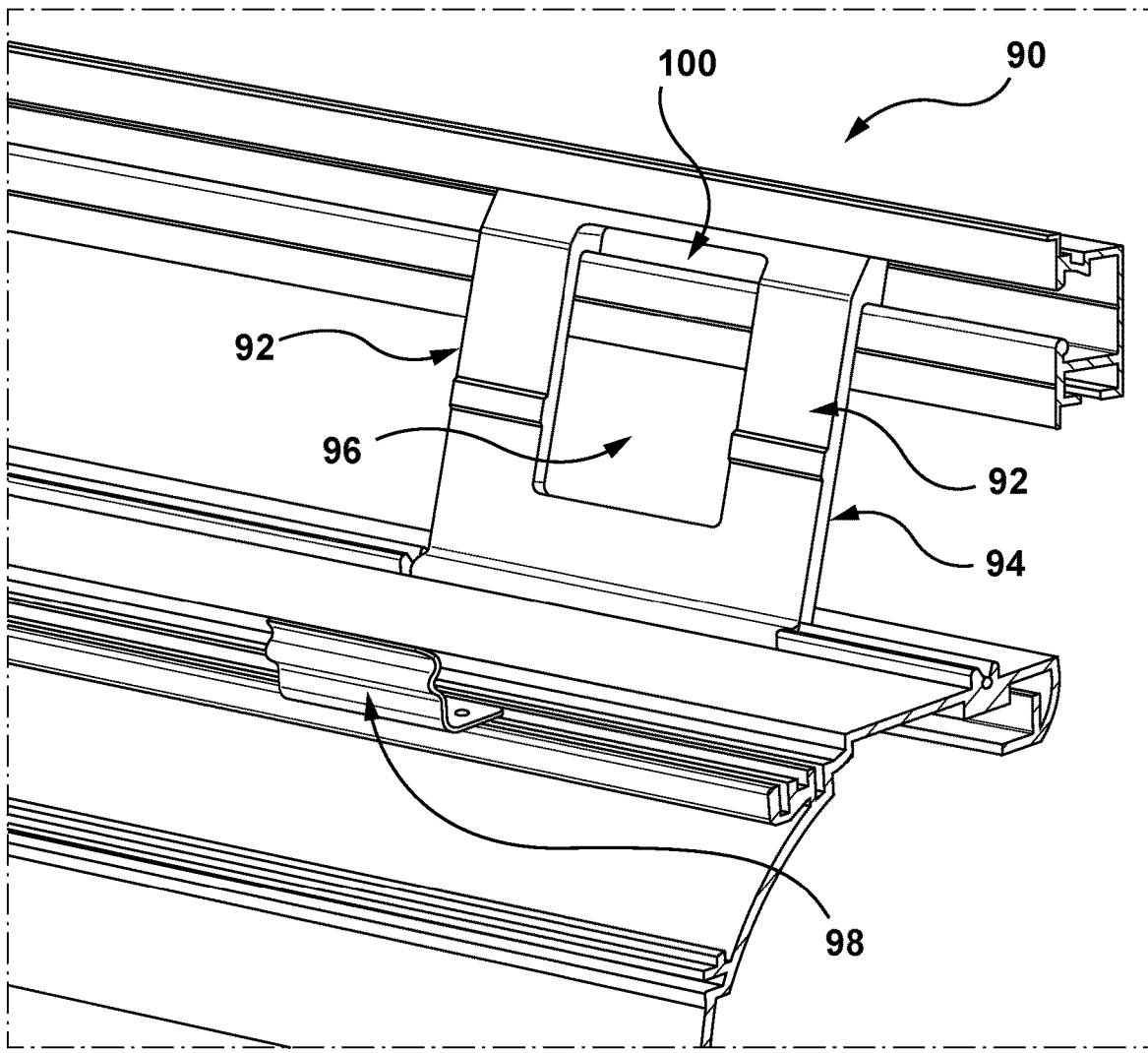
FIGS. 8 and 9 are fragmentary perspective sectional views of a portion of another luminaire structure.
Figure 9:
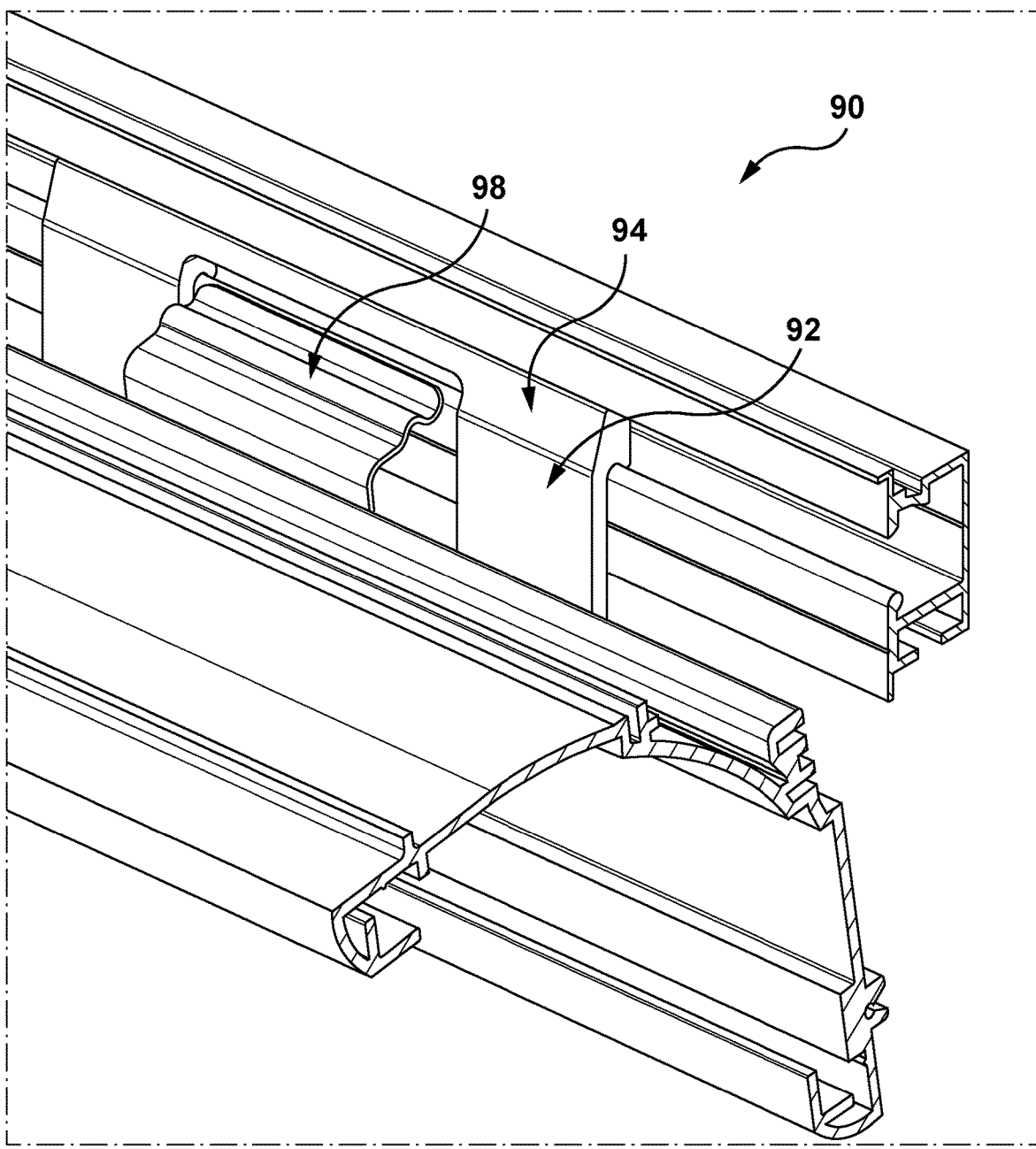

FIGS. 8 and 9 show another luminaire structure 90 in which the pivot arms 92 may form a unitary first pivot structure 94 with a gap 96 which may dimensioned to receive a releasable clip 98 whose width is dimensioned according to the gap, to contact clip engagement surface 100.

Referring to FIGS. 10 to 15, another example embodiment of a luminaire structure is provided at 102 for location in a corner boundary region E of an interior space B, in this case defined by first and second adjacent wall and ceiling boundary surfaces C and D. The luminaire structure 102 comprises a housing structure 104 including first housing and second housing structure segments 106, 108 respectively configured to be located adjacent the first and second boundary surfaces C and D in an operative position.

Figure 11:
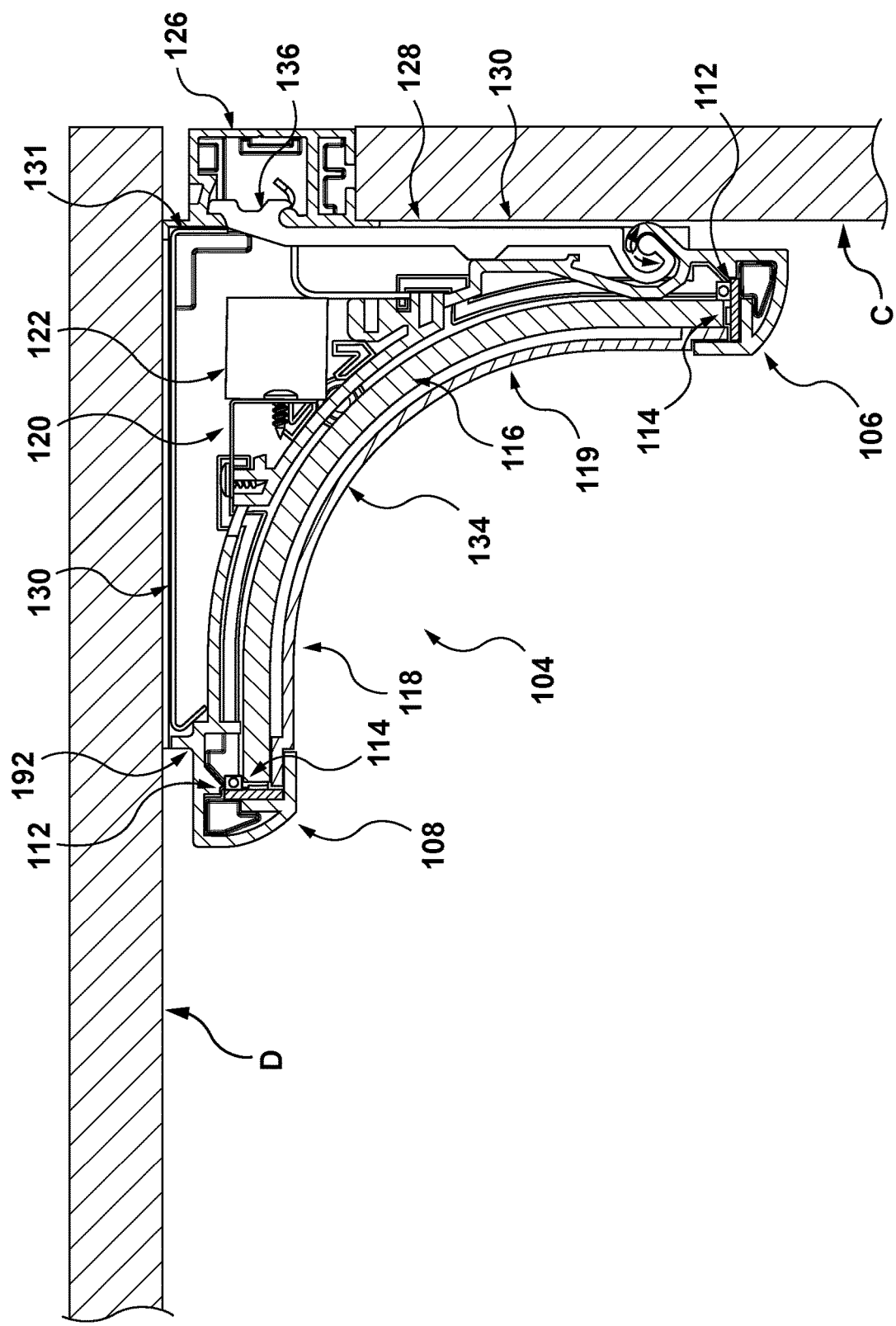
FIG. 11 is a sectional schematic side view of the luminaire structure of FIG. 10 in an operative position.

Referring to FIG. 11, the housing structure 104 may be configured to support at least one LED array 112 of at least one LED 114, to support at least one light delivery structure, in this case a light guide 116, to be located at or adjacent a light output region 118, including lens 119, to present light to the interior space B, and to define at least internal services region 120 to receive one or more components to service the at least one LED array 112, such as a power supply 122.

Figure 10:
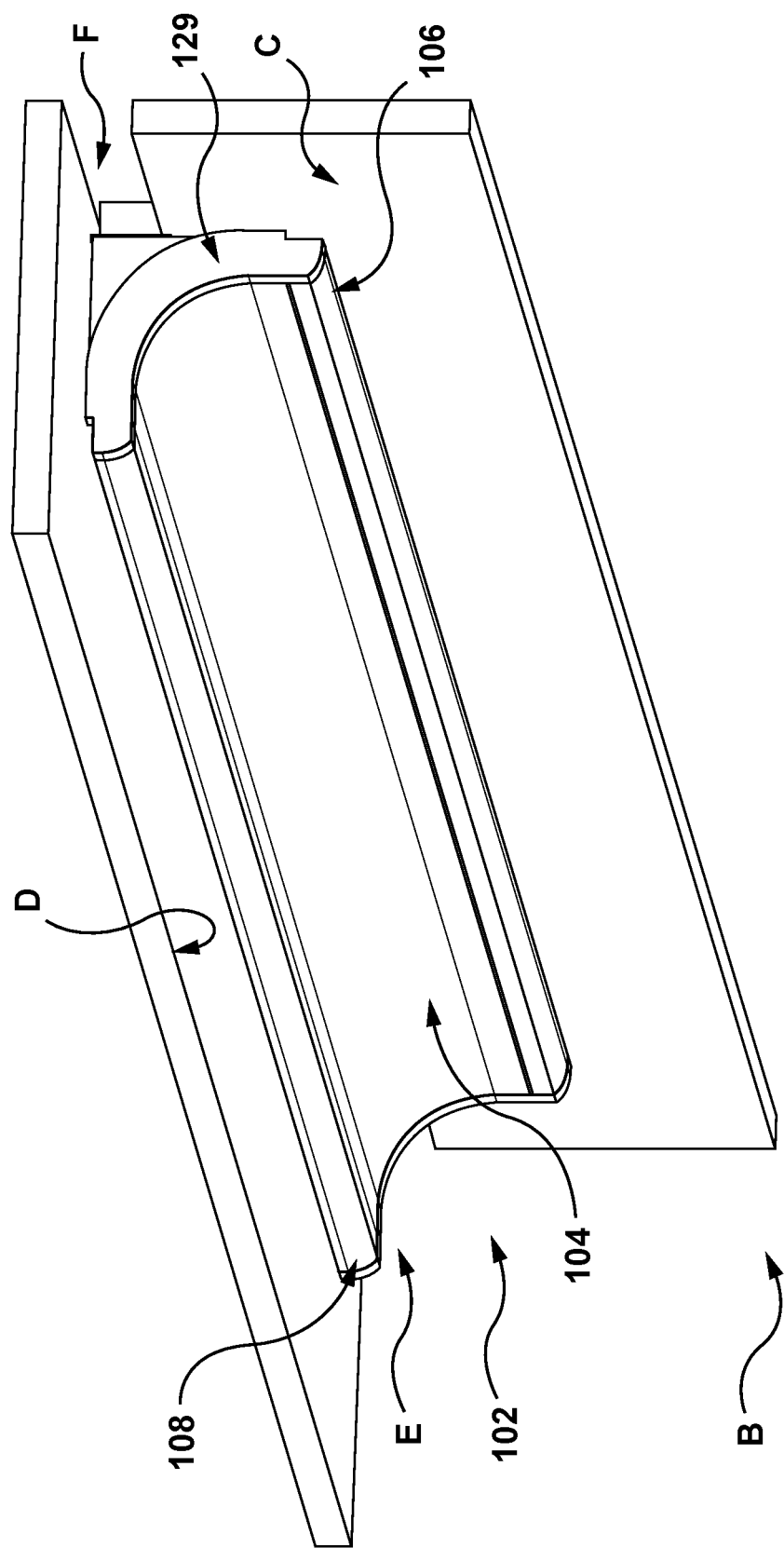
FIG. 10 is a perspective view of another luminaire structure in a corner boundary region of another interior space.
Figure 16:
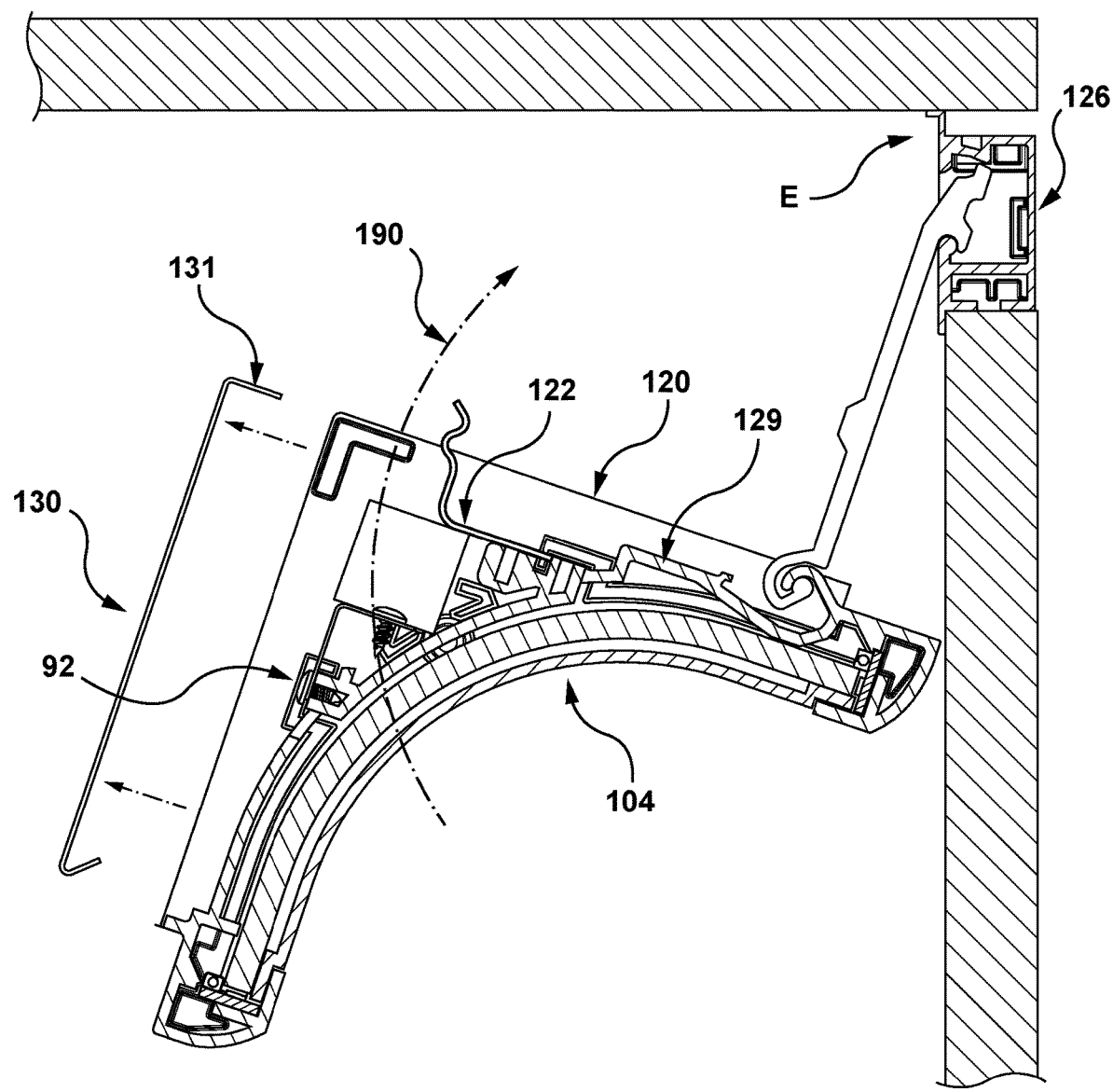
FIG. 16 is a sectional schematic side view of the luminaire structure of FIG. 10 in a servicing position.

Referring to FIGS. 10, 11 and 16, an anchor structure 126 may be provided to anchor the housing structure 104 to the corner boundary region E. In this case, the upright wall boundary surface C is provided with a passage F (FIG. 10) to receive the anchor structure 126. A mounting interface 128 may be configured to cooperate with the housing structure 104 and/or the anchor structure 126 to enable the housing structure 104 to be deployed between a servicing position (as shown in FIG. 16) in which the housing structure 104 is distal to the anchor structure 126, at least in part, and the internal services region 120 is accessible for servicing, and the operative position of FIG. 11, in which the housing structure 104 is proximal to the anchor structure 126, at least in part, and the internal services region 120 is rendered inaccessible for servicing by its proximity to the housing structure 104 and the upright wall and ceiling surfaces C and D thereto.

Figure 12:
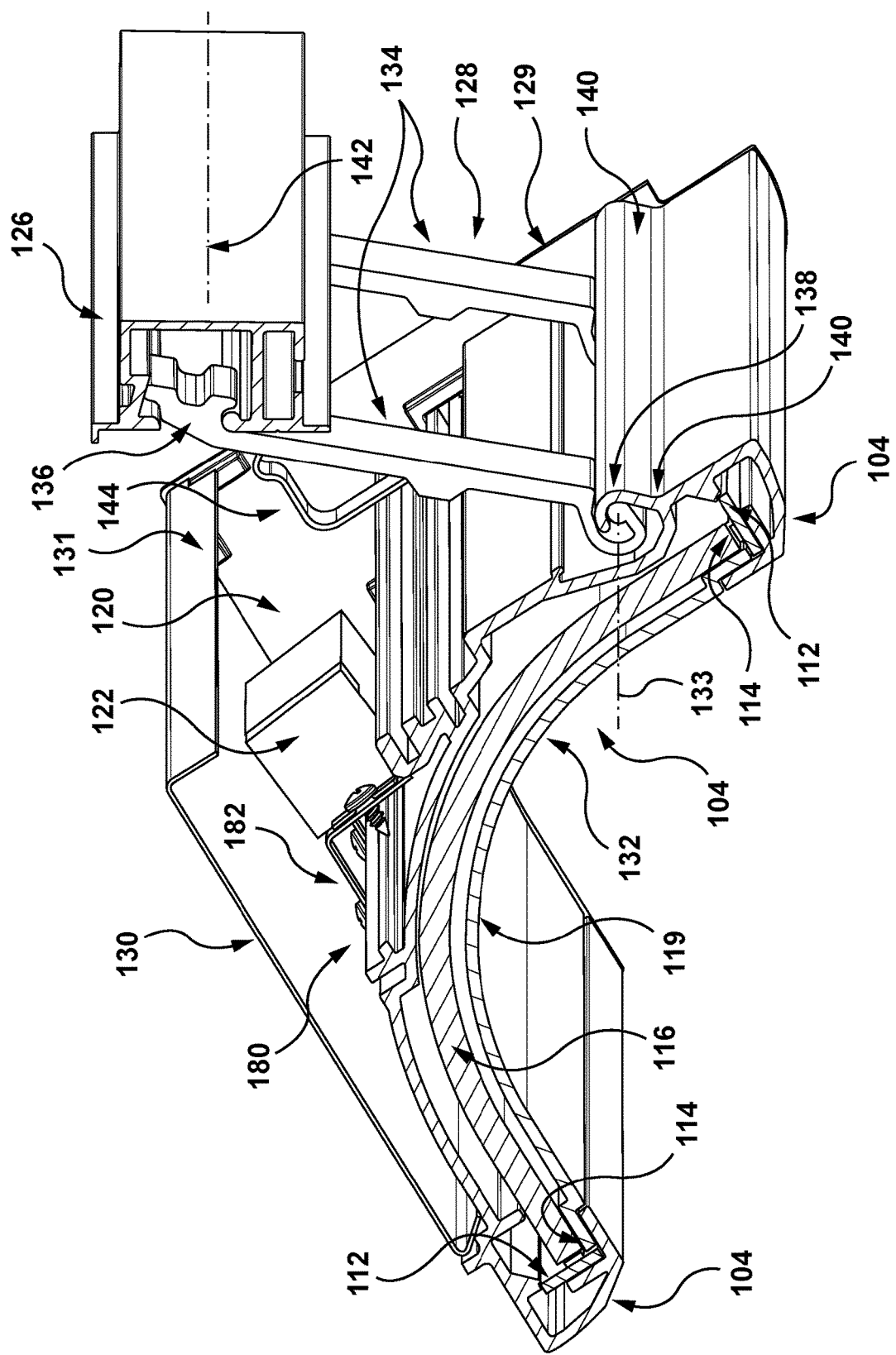
FIGS. 12 and 13 are rear and front perspective view of the luminaire structure of FIG. 10 in an intermediate position.

Referring to FIGS. 10 to 12, the housing structure 104 may be provided with opposed end caps 129, which cooperate with the housing structure 104 to support at least one cover plate (or structure) 130 to enclose the internal services region 120 and which may extend a length dimension of the housing structure 104. The cover plate 130 may be provided with a lip portion 131 to engage or, be in close association with, the anchor structure 126 when in the operative position (FIG. 11) to further enclose the internal services region 120 between the housing structure 104, the cover plate 130 and the end caps 129.

In some example embodiments, as shown in FIGS. 11 to 15, the internal services region 120 may be located adjacent a transitional region 132 (FIG. 13) between the first and second housing structure segments 106, 108.

The mounting interface 128 may be configured to transfer the housing structure 104 between the servicing position (FIG. 16) and the operative position (FIG. 11) about a least one pivot axis 133.

Referring to FIG. 12, the mounting interface 128 may include at least one, in this case a pair of first pivot structures 134 extending between a first mounting location 136 on the anchor structure 126 and a second mounting location 138, on the housing structure 104 for pivotal movement relative to both the first and second mounting locations 136, 138.

The mounting interface 128 may further include at least one second pivot structure 140 engaged with the housing structure 104 to pivotally couple with the first pivot structure 134 at the second mounting location 138.

The anchor structure 126 may be configured to extend along a first upper axis 142 and the mounting interface 128 and anchor structure 126 may include complementary fastener portions of a releasable fastener structure 144 to engage at least one location relative to the first upper axis 142.

The releasable fastener structure 144 may include at least one releasable fastener portion 146 (FIG. 13) on the housing structure 104 to engage at least one location, for example as shown at 148 (FIG. 15), on the anchor structure 126 relative to the first upper axis.

Figure 15:
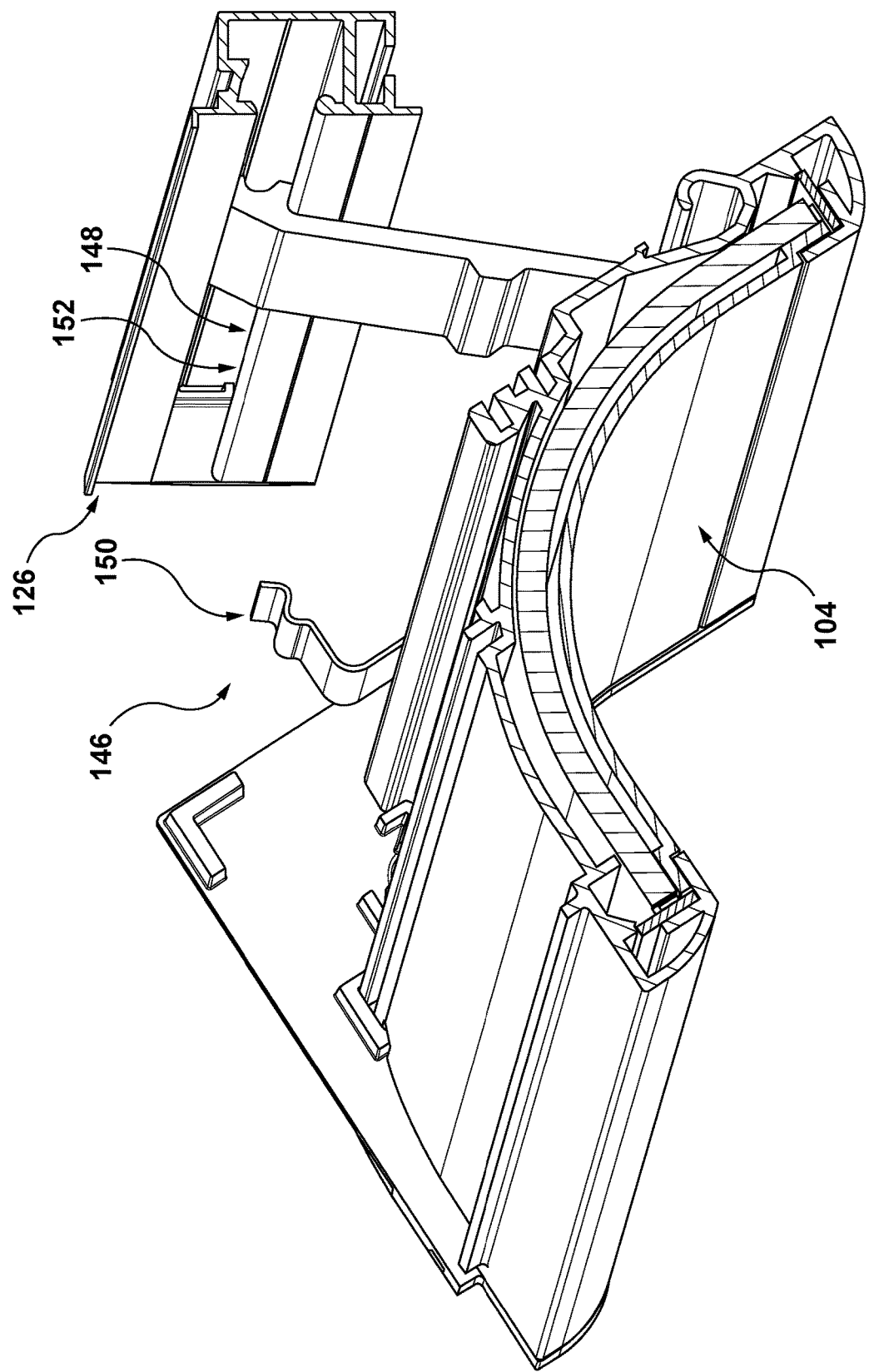

Referring to FIG. 15, the releasable fastener 146 may include at least one releasable clip 150 extending outwardly from the housing structure 104 or the anchor structure 126 to engage at least one corresponding clip engaging surface 152 on the anchor structure 126 or the housing structure 104, respectively.

Figure 13:
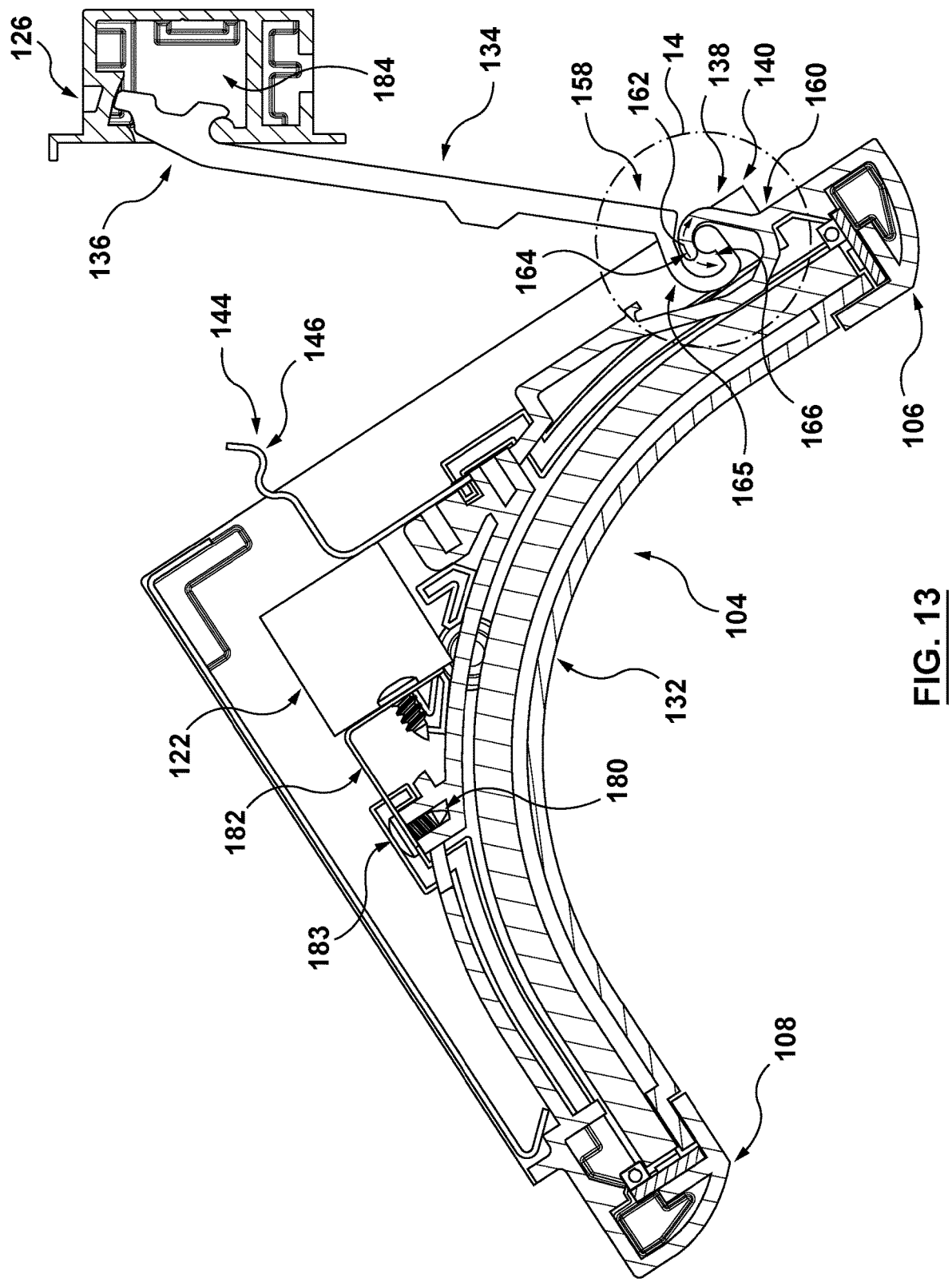
Figure 14:
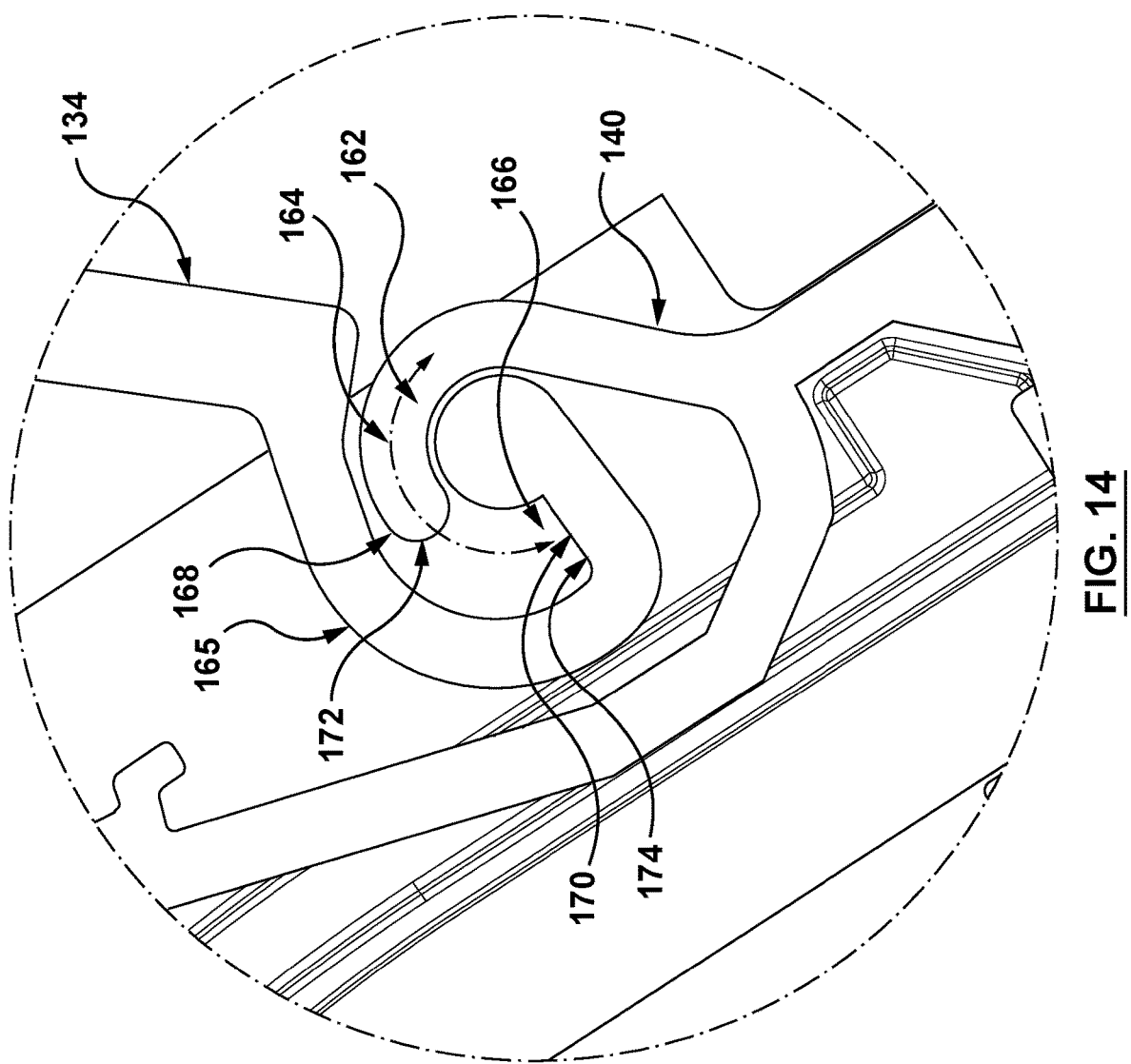
FIG. 14 is a magnified sectional view of the circle 14 in FIG. 13.

In some example embodiments, as shown in FIGS. 12 to 14, the first and second pivot structures 134, 140 may include complementary pivot coupling members 158, 160 configured to define a pivot travel limit, for example at the servicing position of FIG. 16.

In this case, the first and/or second pivot structures 134, 140 may define a pivot path 162, and the second and/or first pivot structures may thus define a traveler 164 to travel along the pivot path 162, wherein the servicing position may be defined by a pivot terminus 166 defined therein. Thus, as shown in FIG. 13, the pivot path may be seen as an inverted u shaped passageway defined in the end region 165 of the first pivot structure 134.

In some example embodiments, as shown in FIG. 14, the first and second pivot structures 134, 140 may be further configured to define first and second termini 168, 170 to abut a proximal end region surface 172, 174 on the second and/or first pivot structures 140, 134 respectively in the servicing position.

In some example embodiments, as shown in FIG. 13, the transitional region 132 may include at least one mounting location 180, in the form of a slot, to locate a power supply support structure 182 thereon and anchor thereto by way of fasteners 183 to support the power supply 122.

In some example embodiments, as shown in FIG. 13, the anchor structure 126 may define an internal passage 184 to receive cabling (not shown) to supply power and/or control signals to a power supply 122 supported by the power supply support structure.

Some exemplary embodiments may provide a method by which the internal services region 120 in the luminaire structure 102 and supporting such things as a power supply, may be rendered accessible and inaccessible, while enabling the luminaire structure 102 to be installed in the corner boundary region E, and in which the first and second housing structure segments 106 and 108 are correspondingly located adjacent, in some cases flush with, intersecting first and second boundary surfaces C and D defining the corner boundary region. In this case, the mounting interface 128 may be configured to enable the housing structure 104 to be deployed between:

the servicing position for example as shown in FIG. 16, in which the housing structure is distal to the corner boundary region E, at least in part, and the internal services region 120 is accessible for servicing; and the operative position as shown in FIG. 11, in which the housing structure 104 is proximal to the corner boundary region E, with the first and second housing structure segments 106, 108 respectively adjacent the first and second boundary surfaces C and D, and the internal services region 120 is rendered inaccessible for servicing by its proximity to the housing structure 102 and the first and second boundary surfaces C and D.

In the servicing position as shown in FIG. 16, the cover plate 130 may be removed from its contact with the end caps 129 and housing structure and anchor structure 130, to provide access to the internal services region 120, as needed. When servicing is complete, the cover plate 130 may be returned to its position as shown in FIGS. 12 and 13, and the housing structure 104 then rotated clockwise as seen by arrow 190 (FIG. 16), until the housing structure 104 is in the operative position.

In some example embodiments, as shown in FIG. 11, the housing structure may be provided a boundary structure 192 which extends outwardly toward the ceiling surface D, sufficient to block access to the cover plate 130 in the service position.

Figure 17:
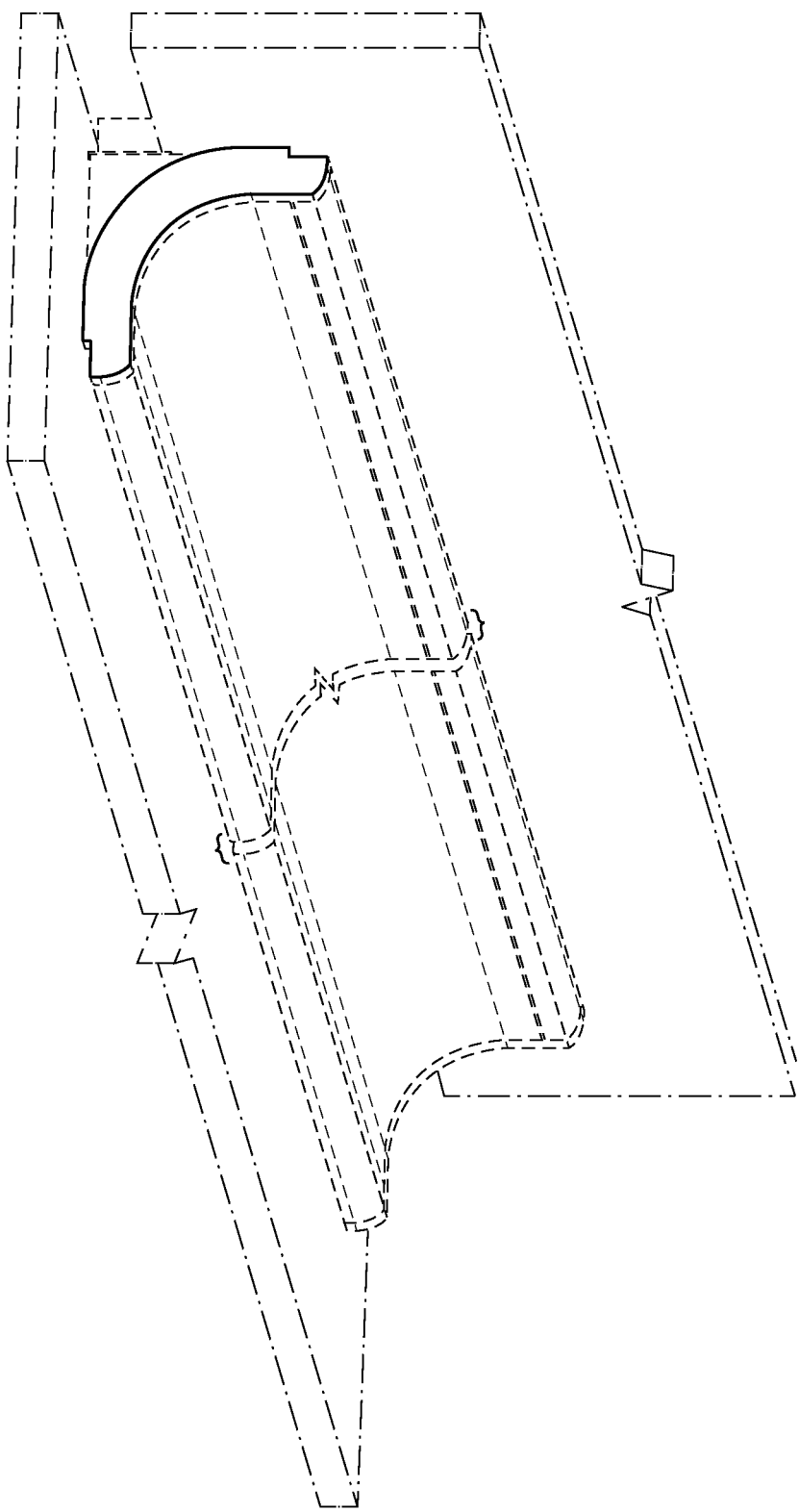
FIG. 17 is a right front perspective view of a luminaire structure of the design showing the design in an installed environment.
Figure 18:
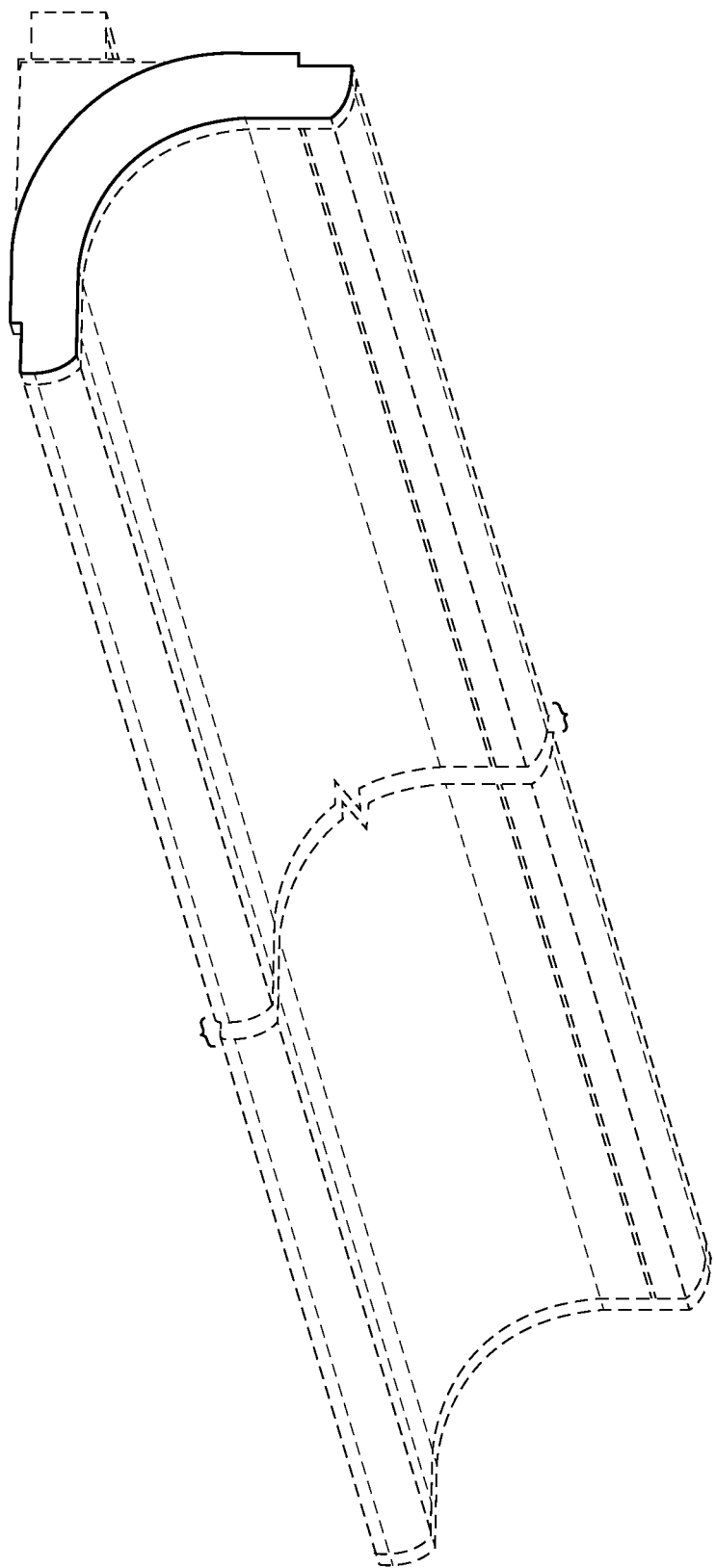
FIGS. 18 and 19 are respective right and left front perspective views of the luminaire structure of FIG. 17.
Figure 19:
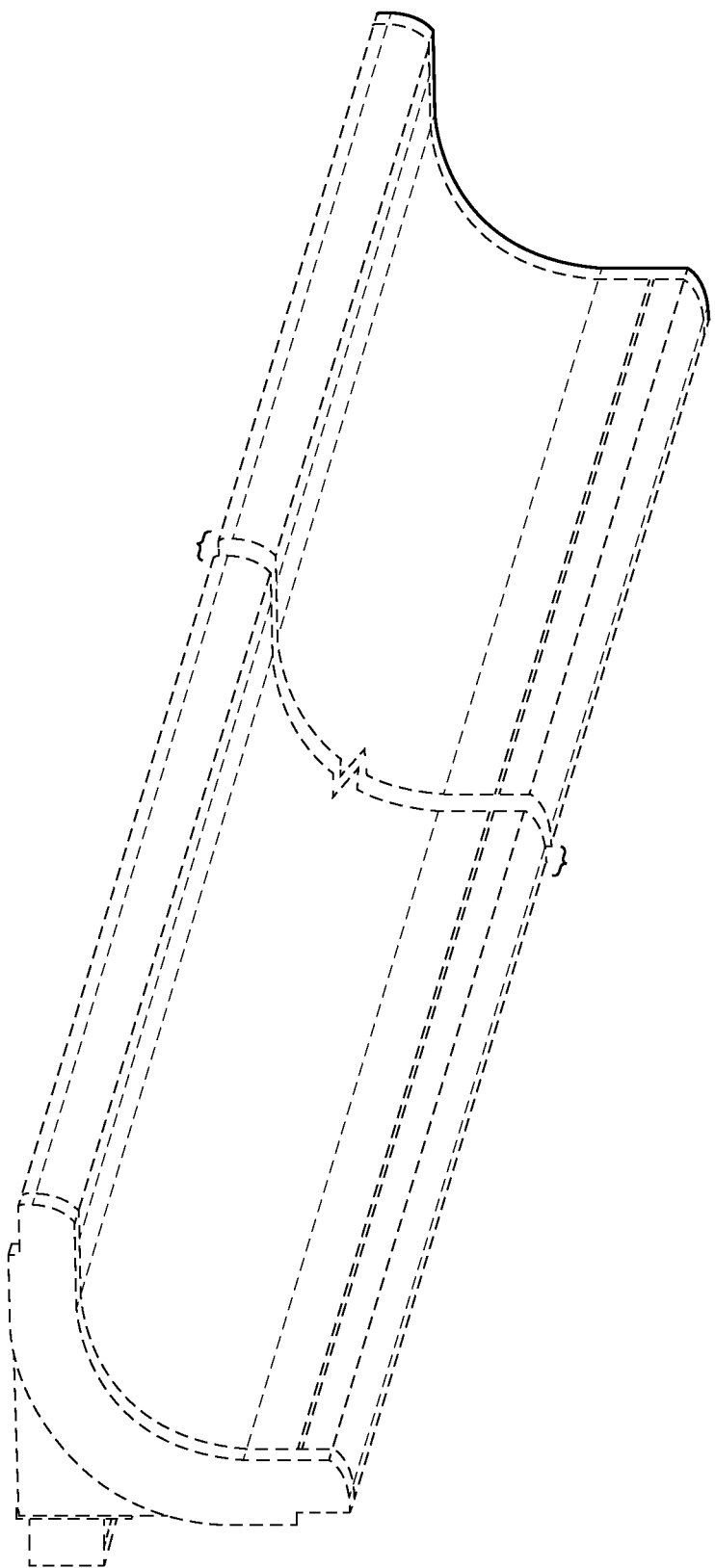
Figure 20:
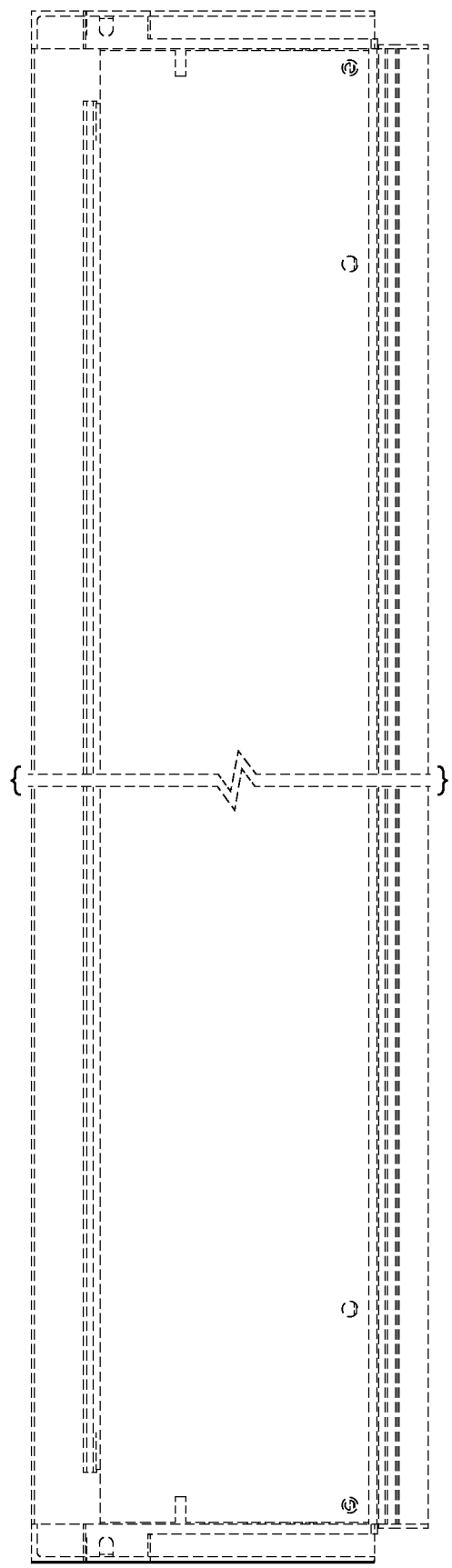
FIGS. 20 and 21 are respective top and bottom plan views of the luminaire structure of FIG. 17.
Figure 21:
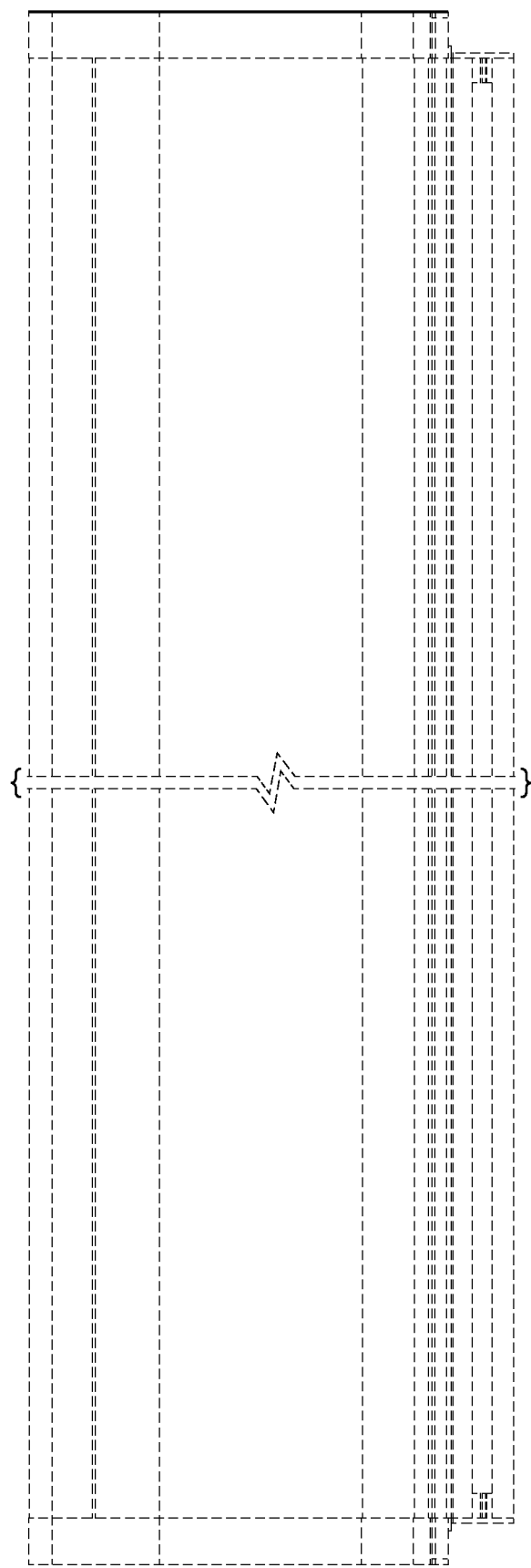
Figure 22:
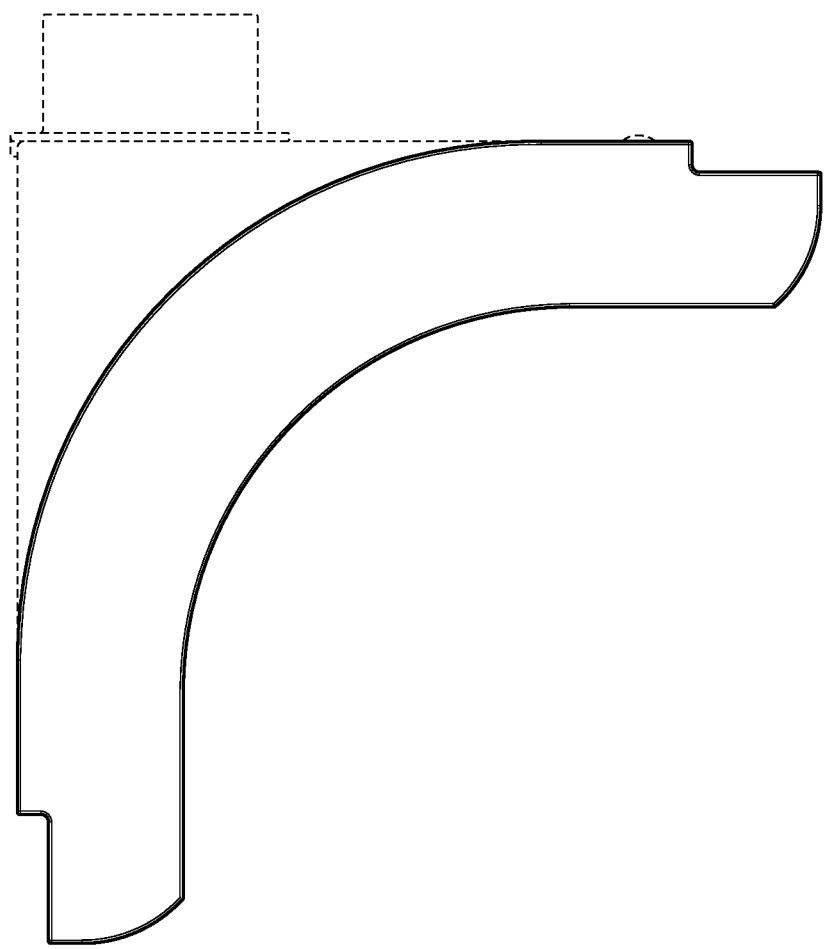
FIGS. 22 and 23 are respective right and left side elevation views of the luminaire structure of FIG. 17.
Figure 23:
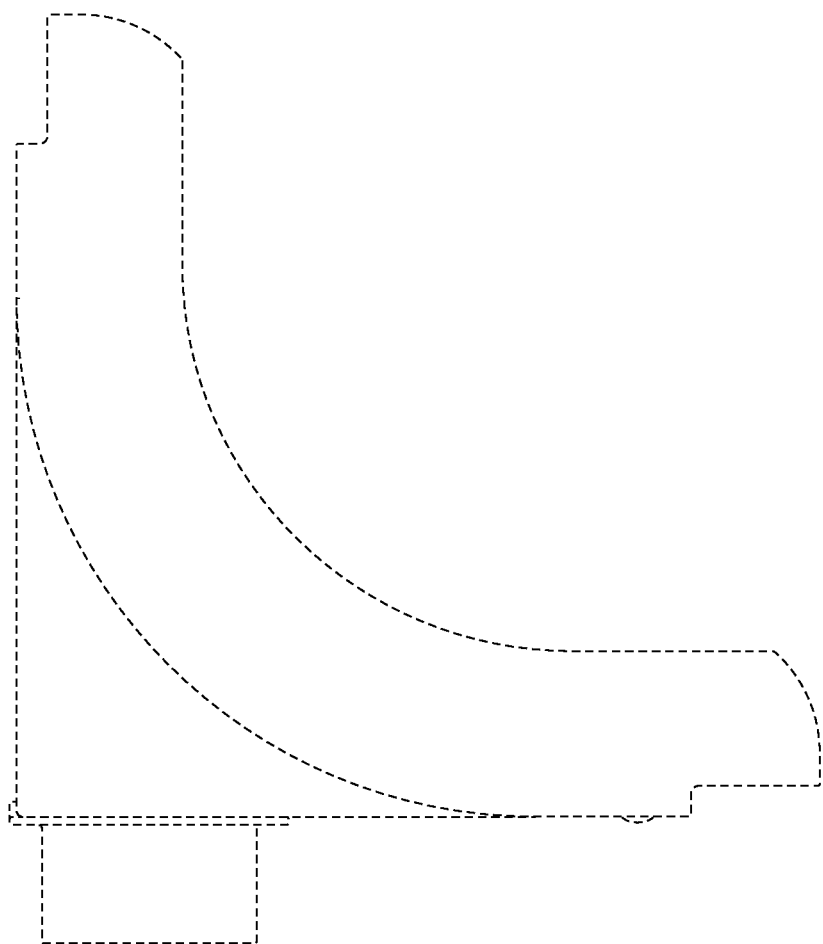
Figure 24:
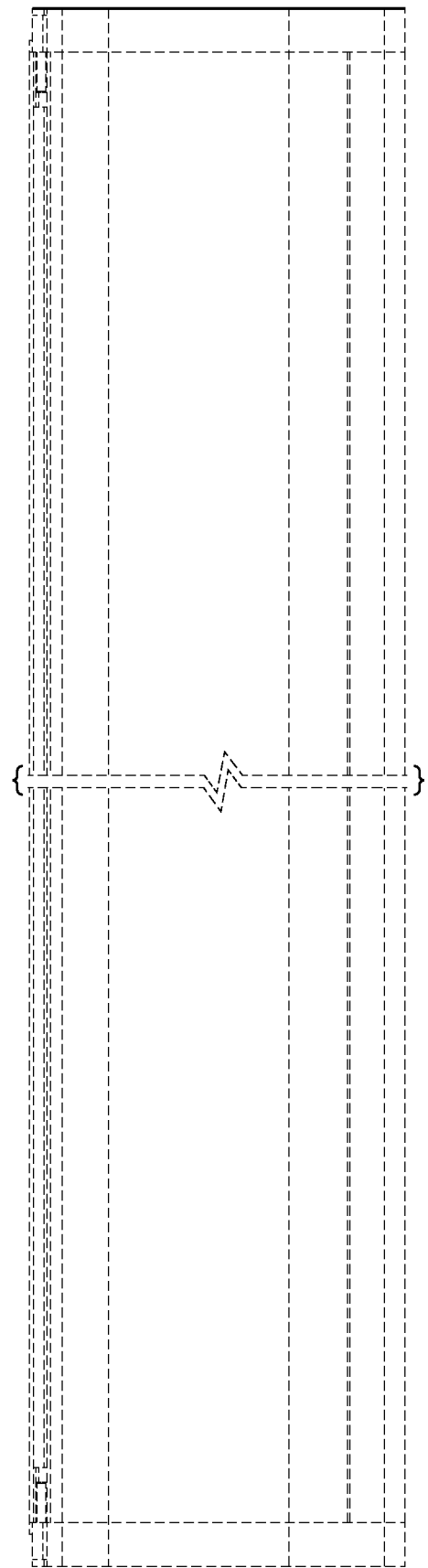
FIGS. 24 and 25 are respective front and rear elevation views of the luminaire structure of FIG. 17.
Figure 25:
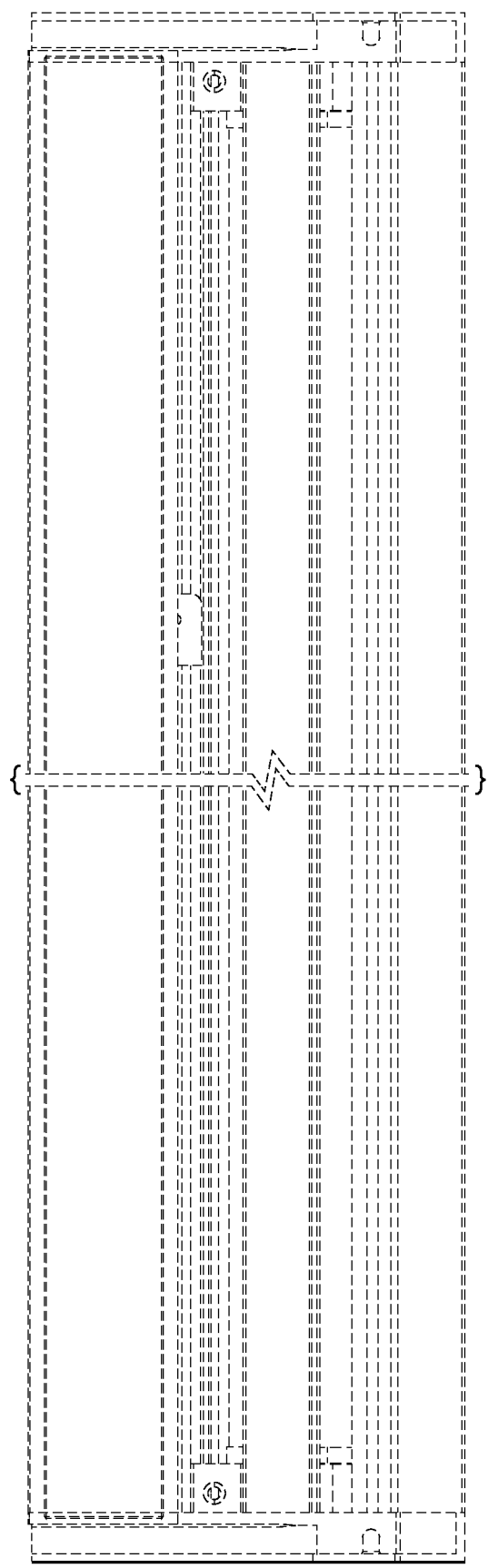
Figure 26:
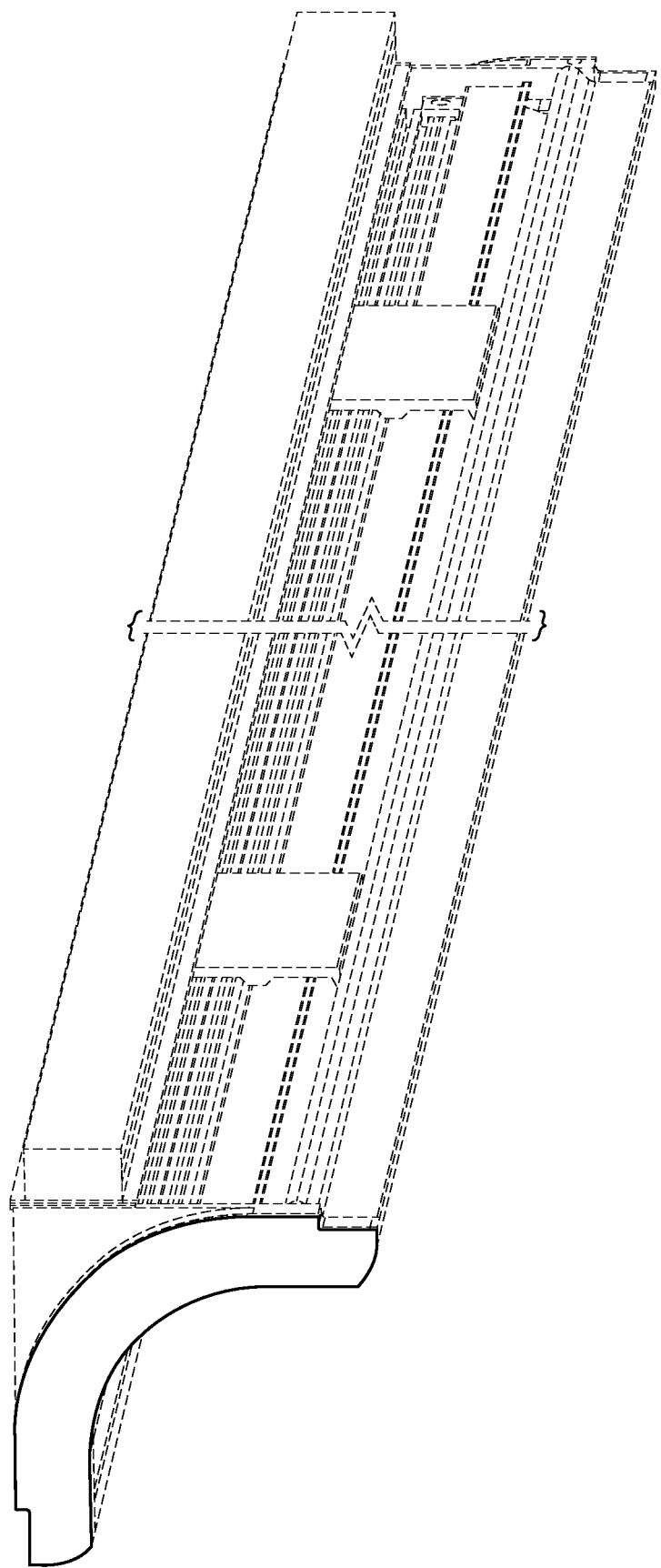
FIG. 26 is a rear perspective view of the luminaire structure of FIG. 17.
Figure 27:
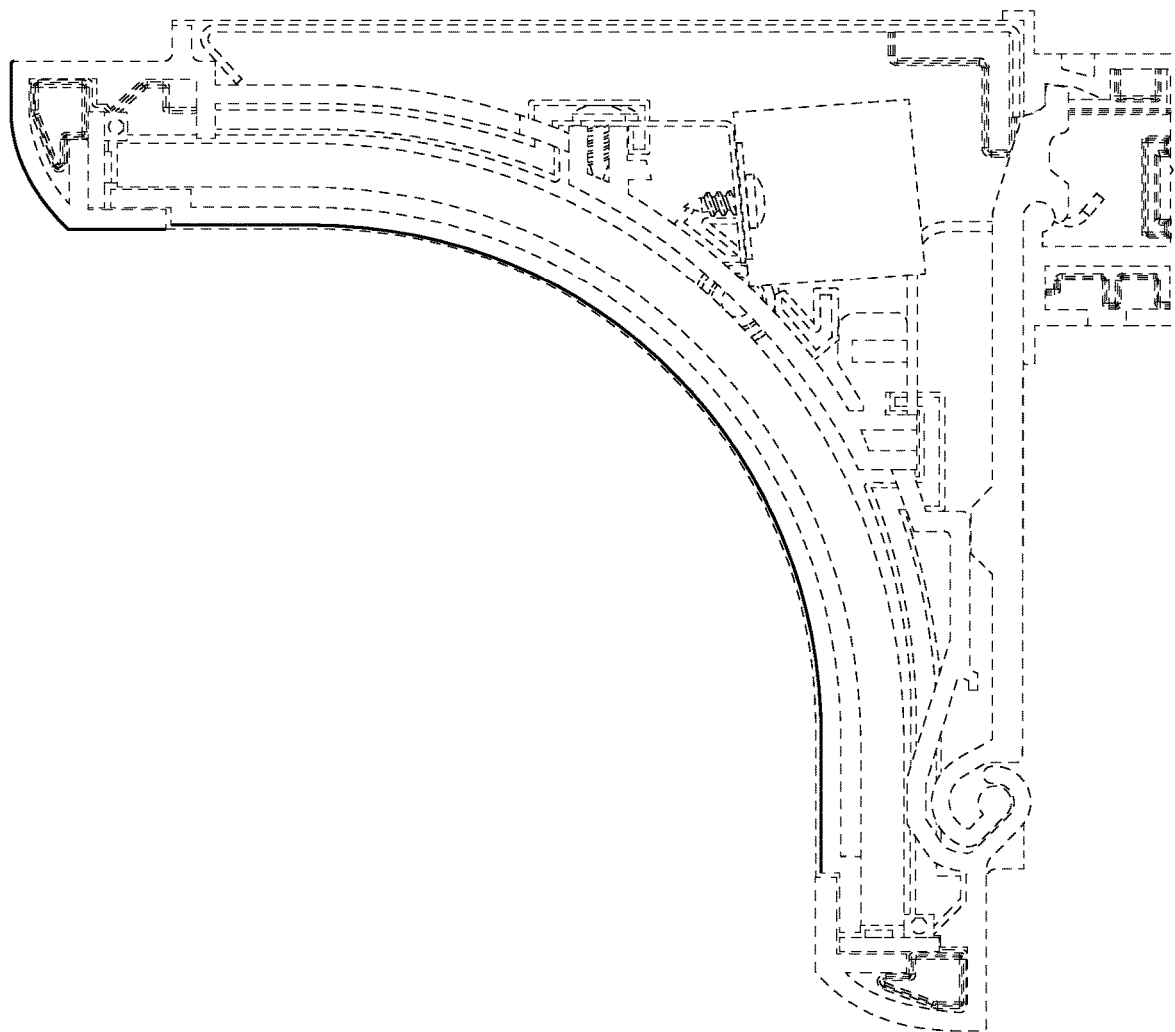
FIGS. 27 and 28 are respective right and left side elevation views of another luminaire structure design.
Figure 28:
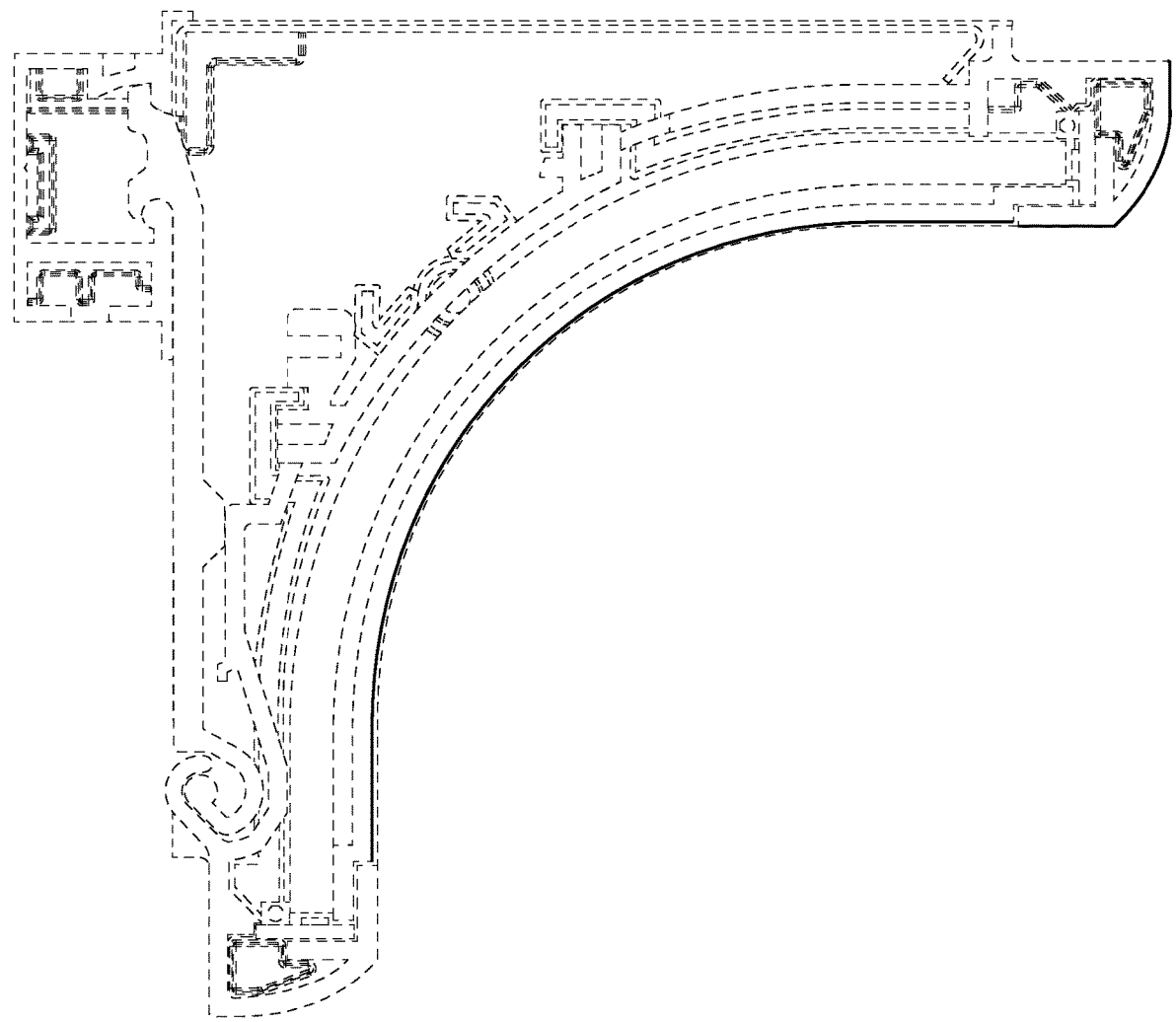
Figure 29:
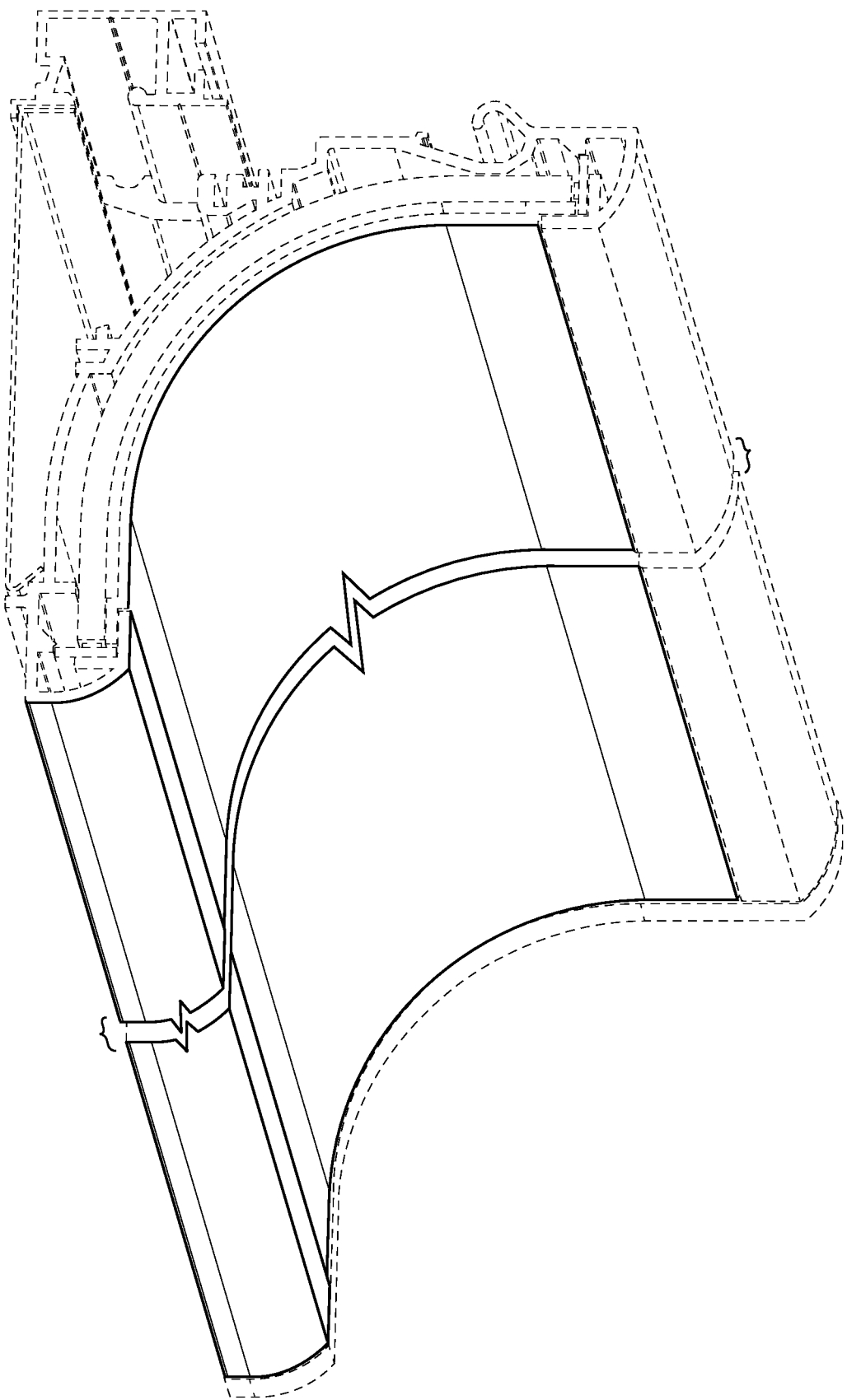
FIGS. 29 and 30 are respective right and left front perspective views of the luminaire structure design of FIGS. 27 and 28.
Figure 30:
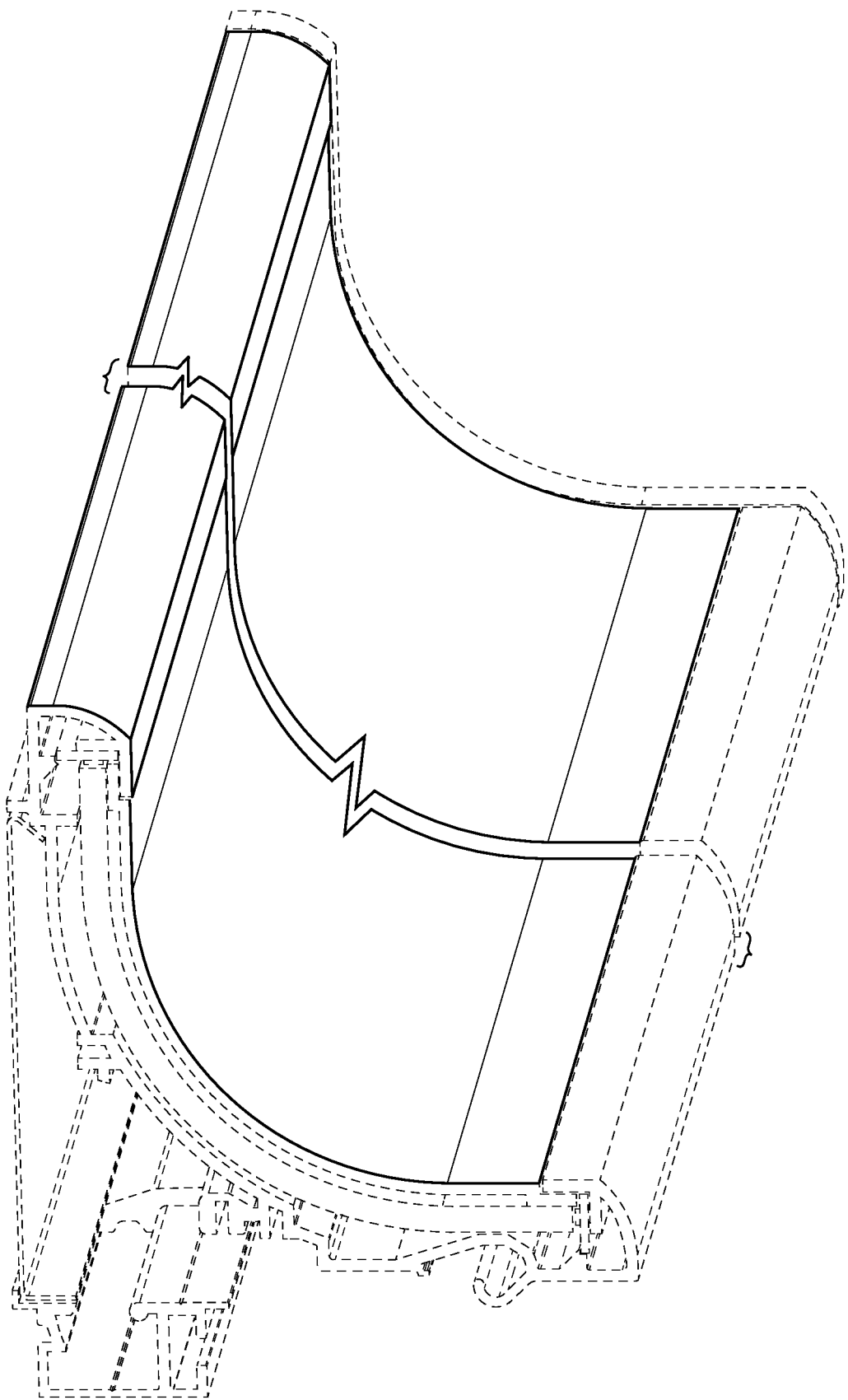

FIG. 17 is a right front perspective view of a luminaire structure of the design showing the design in an installed environment;

FIGS. 18 and 19 are respective right and left front perspective views of the luminaire structure of FIG. 17;

FIGS. 20 and 21 are respective top and bottom plan views of the luminaire structure of FIG. 17;

FIGS. 22 and 23 are respective right and left side elevation views of the luminaire structure of FIG. 17;

FIGS. 24 and 25 are respective front and rear elevation views of the luminaire structure of FIG. 17;

FIG. 26 is a rear perspective view of the luminaire structure of FIG. 17;

FIGS. 27 and 28 are respective right and left side elevation views of another luminaire structure design; and FIGS. 29 and 30 are respective right and left front perspective views of the luminaire structure design of FIGS. 27 and 28;

The broken lines in FIGS. 17-30 are provided for purposes of illustrating portions of the design and are directed to environment. The subject matter herein includes any of the present figures, or new figures based on the present figures, with one or more or less such broken lines shown in solid lines and vice versa. Thus, any change of such one or more broken lines to one or more solid lines, and vice versa, is not new matter.

The luminaire structure is shown in FIGS. 17-21, 24-26, and 29-30, with symbolic break lines along its length. The appearance of a portion of the luminaire structure between the break lines does not form part of the design. A separation and a bracket are used to indicate that, for ease of illustration, the specific dimension of the article associated with the separation and bracket is not claimed and is to be broadly interpreted. The subject matter herein includes any of the present figures with any such symbolic break lines removed, or with one or more further symbolic break lines added. Thus, any removal or addition of one or more any such symbolic break lines is not new matter.

The luminaire structure designs are not limited to the scale shown herein.

FIGS. 17-30 are the ornamental designs for luminaire structures as shown and described.

While the present disclosure describes various exemplary embodiments, the disclosure is not so limited. To the contrary, the disclosure is intended to cover various modifications and equivalent arrangements, as will be readily appreciated by the person of ordinary skill in the art.

The invention claimed is:

1. A luminaire structure for location in a corner boundary region of an interior space defined by first and second adjacent boundary surfaces, the luminaire structure comprising a housing structure including first and second housing structure segments respectively configured to be located adjacent the first and second boundary surfaces in an operative position, the housing structure configured to support at least one LED array of at least one LED, and to support at least one light delivery structure to be located at, or adjacent, a light output region to present light to the interior space, and to define at least one internal services region to receive one or more components therein; and a mounting interface configured to cooperate with the housing structure and/or an anchor structure mounted in or adjacent to the corner boundary region, to enable the housing structure to be deployed between:
   a servicing position in which the housing structure is distal to the anchor structure, at least in part, and the internal services region is accessible for servicing; and
   the operative position in which the housing structure is proximal to the anchor structure, at least in part, and the internal services region is rendered inaccessible for servicing by its proximity to the housing structure and the first and second boundary surfaces.

2. A luminaire structure as defined in claim 1, further comprising the anchor structure.

3. A luminaire structure as defined in claim 2, wherein the anchor structure is configured to extend along a first upper horizontal axis, wherein the housing structure, the mounting interface and/or the anchor structure include at least one releasable fastener structure to engage at least one location relative to the first upper horizontal axis to maintain the housing structure in the operative position.

4. A luminaire structure as defined in claim 2, wherein the internal services region is located adjacent a transitional region between the first and second housing structure segments.

5. A luminaire structure as defined in claim 4, further comprising at least one cover structure to conceal the internal services region, at least in part, wherein the cover is configured to be removably positioned on the housing structure, at least in part, and accessible in the servicing position for removal, and inaccessible in the operative position.

6. A luminaire structure as defined in claim 5, wherein the at least one cover structure extends along a length dimension of the housing structure.

7. A luminaire structure as defined in claim 4, wherein the mounting interface is configured to transfer the housing structure between the servicing position and the operative position about at least one pivot axis.

8. A luminaire structure as defined in claim 7, wherein the mounting interface includes at least one first pivot structure extending between a first mounting location on the anchor structure and a second mounting location on the housing structure for pivotal movement relative to both the first and second mounting locations.

9. A luminaire structure as defined in claim 8, wherein the mounting interface includes at least one second pivot structure engaged with the housing structure to pivotally couple with the first pivot structure at the second mounting location.

10. A luminaire structure as defined in claim 9, wherein the first and second pivot structures include complementary pivot coupling members configured to define a pivot travel limit at the servicing position.

11. A luminaire structure as defined in claim 10, wherein the first and/or second pivot structures defines a pivot path, and the second and/or first pivot structures defines a traveler to travel along the pivot path, wherein the servicing position is defined by a pivot terminus defined therein.

12. A luminaire structure as defined in claim 11, wherein the first and second pivot structures are configured to define first and second termini to abut a proximal end region surface on the second and/or first pivot structures respectively in the servicing position.

13. A luminaire structure as defined in claim 4, wherein the transitional region includes at least one mounting location to locate a power supply support structure thereto to support a power supply.

14. A luminaire structure as defined in claim 13, comprising the at least one LED array, and the at least one light delivery structure.

15. A luminaire structure as defined in claim 14, further comprising the power supply.

16. A luminaire structure as defined in claim 8, wherein the anchor structure includes an opening configured to extend along a first upper horizontal axis, the opening having opposed longitudinal boundaries to form the first mounting location therebetween, and wherein the first pivot structure includes at least one first end region with a pair of opposed end surface regions, with each thereof configured to engage a corresponding longitudinal boundary.

17. A luminaire structure as defined in claim 16, wherein the first pivot structure is configured to pivot by contact between a first of the opposed end regions and a corresponding first of the opposed longitudinal boundaries.

18. A luminaire structure, as defined in claim 17, wherein the first pivot structure is configured to be limited in pivotal travel in at least one direction by contact between a second of the opposed end regions and a corresponding second of the opposed longitudinal boundaries.

19. A luminaire structure as defined in claim 18, further comprising a limit surface adjacent the second longitudinal boundary which is configured to follow the second end region through a first range of travel thereof during which contact is substantially maintained between the first end region and first longitudinal boundary, and wherein the second end region has a second range of angular travel beyond the limit surface to enable the first end region to be separated from the first longitudinal boundary so that the first pivot structure may be removed from the anchor structure.

20. A method for servicing a luminaire structure in a corner boundary region of an interior space defined by first and second adjacent boundary surfaces, comprising:
    providing a luminaire structure for location in the corner boundary region, the luminaire structure comprising a housing structure including first and second housing structure segments respectively configured to define a light output region and to support at least one LED array of at least one LED optically linked thereto, and configured to be located adjacent the first and second boundary surfaces in an operative position, and to define at least one internal services region to receive one or more components to operate the at least one LED array;
    configuring a mounting interface to enable the housing structure to be deployed between:
        a first position in which the housing structure is distal to the corner boundary region, at least in part, and the internal services region is accessible for servicing; and
        a second position in which the housing structure is proximal to the corner boundary region with the first and second housing structure segments respectively adjacent the first and second boundary surfaces, and the internal services region is rendered inaccessible for servicing by its proximity to the housing structure and the first and second boundary surfaces.

21. A luminaire structure for location on a boundary region of an interior space, comprising:
    a housing structure configured to support at least one light delivery structure;
    an anchor structure configured to be positioned at a mounting location on the boundary region;
    a mounting structure configured to cooperate with the housing structure and the anchor structure to enable the housing structure to be positioned in an operative position at the mounting location;
    the anchor structure configured to provide a pair of opposed boundaries to extend along a mounting location axis, to form the mounting location therebetween;
    the mounting structure comprising a pair of opposed end surface regions, with each thereof configured to engage a corresponding boundary when in the operative position;
    wherein the mounting structure is configured to be passed between the opposed boundaries, when in a first angular orientation relative to the anchor structure, so that a first of the end regions engages a corresponding first of the opposed boundaries, while a second of the opposed boundaries is configured to define a second angular orientation corresponding to the operative position, and wherein the anchor structure is configured to define a range of travel of the mounting structure between the first and second angular positions in which the mounting structure cannot be removed from the anchor structure.

22. A luminaire structure as defined in claim 21, wherein the mounting structure is configured to define at least a portion of the travel between the first and second angular positions to pivotal travel by contact between the first end region and first boundary.

23. A luminaire structure as defined in claim 22, further comprising a limit surface adjacent the second boundary which is configured to follow the second end region through a first range of travel thereof during which contact is substantially maintained between the first end region and first boundary, and wherein the second end region has a second range of angular travel beyond the limit surface to enable the first end region to be separated from the first boundary so that the first pivot structure may be removed from the anchor structure.

24. A luminaire structure for location on a boundary region of an interior space, comprising:
    a housing structure configured to support at least one light delivery structure to present light to the interior space;
    an anchor structure configured to be positioned on the boundary region;
    a mounting interface configured to cooperate with the housing structure and the anchor structure to enable the housing structure to be positioned in an operative position at a mounting location on the boundary region;
    the anchor structure configured to provide an opening to extend along an axis along the boundary region, the opening having opposed longitudinal boundaries to form the first mounting location therebetween;
    the mounting interface including a mounting structure with a pair of opposed end surface regions, with each thereof configured to engage a corresponding longitudinal boundary in the operative position;
    wherein the mounting structure is configured to be passed through the opening in a first angular orientation relative to the anchor structure, so that a first of the end regions engages a corresponding first of the longitudinal boundaries of the anchor structure, while a second of the longitudinal boundaries is configured to define a second angular orientation in which the first and second end regions engage the corresponding first and second boundaries.

25. A luminaire structure as defined in claim 24, wherein the mounting structure is configured to define at least a portion of the travel between the first and second angular positions to pivotal travel by contact between the first end region and first boundary.

26. A luminaire structure as defined in claim 24, further comprising a limit surface adjacent the second boundary which is configured to follow the second end region through a first range of travel thereof during which contact is substantially maintained between the first end region and first boundary, and wherein the second end region has a second range of angular travel beyond the limit surface to enable the first end region to be separated from the first boundary so that the first pivot structure may be removed from the anchor structure.

\* \* \* \* \*